United States Patent [19]
Satoh et al.

[11] Patent Number: 5,581,587
[45] Date of Patent: Dec. 3, 1996

[54] CONTROL ROD DRIVING APPARATUS

[75] Inventors: Yoshifumi Satoh, Kawasaki; Akira Nakamura, Yokohama; Katsuhiko Mawatari, Tokyo, all of Japan

[73] Assignee: Kabushiki Kaisha Toshiba, Kawasaki, Japan

[21] Appl. No.: 240,470

[22] Filed: May 10, 1994

[30] Foreign Application Priority Data

May 10, 1993 [JP] Japan ................... 5-107958

[51] Int. Cl.⁶ .................................... G21C 7/06
[52] U.S. Cl. ................ 376/230; 376/219; 376/231; 376/236; 376/232; 376/223
[58] Field of Search ................. 376/230, 219, 376/231, 236, 232, 223; 976/DIG. 125, DIG. 126, DIG. 127

[56] References Cited

U.S. PATENT DOCUMENTS

| | | | |
|---|---|---|---|
| 3,347,748 | 10/1967 | Olsson | 376/230 |
| 3,629,059 | 12/1971 | Agazzi | 376/328 |
| 4,060,452 | 11/1977 | Acher | 376/223 |
| 4,288,290 | 9/1981 | Saima et al. | 376/245 |
| 4,690,794 | 9/1987 | Onodera | 376/230 |
| 5,089,211 | 2/1992 | Dillmann | 376/232 |
| 5,232,656 | 8/1993 | Kotlyar | 376/219 |
| 5,378,064 | 1/1995 | Satoh et al. | 376/230 |

Primary Examiner—Charles T. Jordan
Assistant Examiner—Meena Chelliah
Attorney, Agent, or Firm—Oblon, Spivak, McClelland, Maier & Neustadt, P.C.

[57] ABSTRACT

A control rod driving apparatus adapted to drive a control rod assembly for a nuclear reactor is disposed in a housing mounted to a reactor pressure vessel of the nuclear reactor and includes a guide tube disposed in the housing, a connection pipe disposed inside the guide tube coaxially therewith and having one end to which a control rod assembly is connected, a ball spindle disposed inside the connection pipe and supported thereby so as to be rotatable by a ball nut assembly engaged with the ball spindle so as to be axially movable along the ball spindle, the ball nut assembly supporting another end of the connection pipe, a hydraulic drive operatively connected to the ball spindle to rotate the ball spindle, and a transmission mechanism operatively connected to the drive for transmitting a power of the drive to the ball spindle. When the hydraulic drive is driven, the ball spindle is rotated, the ball nut assembly engaged with the ball spindle is axially rotated, and the connection pipe supported by the ball nut assembly is then driven vertically to thereby drive the control rod assembly for inserting or withdrawing the control rod assembly into or from a reactor core. The reactor is a boiling water reactor.

31 Claims, 12 Drawing Sheets

CONTROL ROD DRIVING APPARATUS

BACKGROUND OF THE INVENTION

1. Field of the Invention

The present invention relates to an apparatus for driving a control rod for adjusting power from a reactor, preferably adapted for a boiling water reactor.

2. Description of the Related Art

In general, the basic operation for controlling power from a nuclear reactor is an adjustment of a reactivity thereof. By adequately controlling the quantity of the reactivity, the reactor plant can totally be controlled. In many reactors, control of the reactivity is performed by inserting or withdrawing a control rod, in which a neutron absorber is enclosed, to and from a reactor core.

In a boiling water reactor (BWR), four fuel assemblies are disposed around a cross-shaped control rod to form one unit, and a plurality of the thus-arranged units are disposed so as to constitute the reactor core. The reactivity of the BWR is controlled by withdrawing or inserting the control rod from or into the reactor core. The control rod is inserted/withdrawn by a control rod driving apparatus connected to the control rod.

FIG. 10 is a view which illustrates an example of the structure of a conventional control-rod drive apparatus. The control rod driving apparatus 1 is inserted into a housing 3 which is formed integrally with a reactor pressure vessel 2 by welding. The control rod driving apparatus 1 has an electric motor 4 at the lower end thereof. A ball spindle 5, the rotations of which are controlled by the electric motor 4, is supported by a bearing 6 and a roller 7 through a rotational shaft 21. A ball nut 9, the rotations of which are inhibited by a groove, not shown, vertically formed in the inner surface of a guide tube 8, is attached to the ball spindle 5 by means of a thread. A connection pipe 10 having the lower end supported by the ball nut 9 establishes the connection with a control rod 11 to be inserted/withdrawn from a reactor core, not shown, of the reactor. The connection pipe 10 has a structure that its rotation is inhibited similarly to the ball nut 9. Furthermore, a lower guide roller 12 is disposed adjacent to the lower portion of the connection pipe 10 so that movement of the connection pipe 10 in the circumferential direction is restricted and its axial directional movement is smoothened. The lower end of the guide tube 8 is placed on a cylinder member 51 connected to the housing 3 through a spool piece 20, the guide tube 8 having the top end to which a damper 13 is attached. The damper 13 is supported by an upper guide 15 through a disc spring 14 so as to be capable of moving upwards a small distance. The upper guide 15 is attached to the reactor pressure vessel 2 through a damper sleeve 16. In addition, outward leakage of reactor water is prevented by a shaft sealing packing 17 disposed between the ball spindle 5 and a cylinder member 51 so that a water-tight seal is realized.

In the thus-constituted control rod driving apparatus 1, when the ball spindle 5 is rotated due to rotations of the electric motor 4, the ball nut 9 allowed to engage with the ball spindle 5 is permitted to be moved only in the axial direction. Therefore, the connection pipe 10 mounted on the ball nut 9 follows the movement of the ball nut 9, causing the control rod 11 connected to the connection pipe 10 to be moved vertically.

If the control rod 11 is rapidly inserted (hereinafter called "scram") during an emergency for the reactor, water accumulated in an accumulator, not shown, is passed through a scram-water injection pipe 18 so as to be introduced into the guide tube 8. As a result, the connection pipe 10 is rapidly pushed in the upper direction so that the scram is performed.

Thus, the control rod driving apparatus 1 is, as described above, driven by the electric motor operated in a usual operation and by the hydraulic pressure used in the case where the scram is performed.

The positions of the connection pipe 10 and the control rod 11 are maintained by the maintaining torque of the electric motor 4 and the friction of the shaft sealing packing 17. In the case where the scram-water injection pipe 18 is broken, for example, it may be considered that hydraulic pressure for pushing the connection pipe 10 in the downward direction acts. Accordingly, an electro-magnetic brake 19 is attached below the electric motor 4.

Since the body of the control rod driving apparatus has no sliding and contact elements such as the piston seal, it has been considered that it has no element which must be periodically changed in a period of forty years which is the life of the reactor. That is, a substantially maintenance-free state has been achieved for the body of the control rod driving apparatus.

Since the shaft sealing packing 17 is gradually degraded due to sliding and high temperature environment in the shaft sealing portion, periodical change is required. The shaft sealing packing 17 is periodically changed in a procedure such that initially the electric motor 4 is removed, and the spool piece 20 accommodating the shaft sealing portion is removed. Then, the spool piece 20 is decomposed, and the shaft sealing packing 17 is changed. Assembly is performed by the inverse of the foregoing procedure.

FIG. 11 is a view which illustrates another example of the structure of a conventional control rod driving apparatus. In this example, a connection pipe 30 is connected to a control rod 11 through a joining member 31. A drive piston 32 is disposed at the lower end of the connection pipe 30. The drive piston 32 constitutes a piston cylinder structure in association with a piston tube 33 and a cylinder tube 34. When hydraulic pressure is applied to an insertion port 35, drive water is allowed to pass through a passage designated by an arrow 36 so as to act on the lower surface of the drive piston 32. Thus, the drive piston 32 is pushed upwards. Therefore, the connection pipe 30 is moved upwards so that the control rod 11 is inserted into a reactor core. The position of the inserted control rod 11 is fixed because a control-rod position fixing finger 38 is received in a Groove 37 formed in the surface of the connection pipe 30. Therefore, the control rod 11 is fixed at step positions, the intervals of which correspond to the positions at which the grooves 37 are formed.

When the control rod 11 is withdrawn from the reactor core, hydraulic pressure is applied to a withdrawal port 39. Driving water is allowed to pass through a passage designated by an arrow 40 to pass through a hole 41 formed in the upper portion of the piston tube 33 and pass through a space between the piston tube 33 and the connection pipe 30 so as to act on the top surface of the drive piston 35. As a result, the drive piston is pushed downwards. On the other hand, a portion of the driving water is allowed to pass through a passage designated by an arrow 42 so as to act on the lower surface of the piston 43 and push the piston 43 upwards. Further, the control-rod position fixing finger 38 formed integrally with the piston 43 is moved upwards and widened by a guide member 44 so as to be separated from the groove.

If the control rod 11 is rapidly inserted into the reactor core during an emergency for the reactor, high-pressure water accumulated in an accumulator, not shown, is supplied to the insertion port 35 so as to rapidly push up the drive piston 32 and the connection pipe 30. Thus, the control rod 11 is inserted into the reactor core to cope with the emergency.

In a conventional BWR, either of the control-rod drive apparatuses respectively shown in FIGS. 10 and 11 is employed for all units constituting the reactor core without using the two types of the apparatus in a combined manner. The reason for this is that the combination necessitates the power source and the hydraulic pressure source as a drive source. Further, two types of control rod driving apparatus must be used because of differences in the control methods, thus causing the system's structure to be complicated. Therefore, an economical disadvantage arises.

A hydraulic pressure supply system in a conventional BWR arranged in a case where a hydraulic piston drive method as shown in FIG. 11 is employed will now be described.

FIG. 12 illustrates the schematic structure of a hydraulic pressure supply system in a conventional example. The piping structure is arranged in such a manner that a hydraulic-pressure supply portion 100 comprises a pump 101, a flow meter 102, a flow-rate adjustment valve 103, a pressure-adjustment valve 104 and a stabilizing circuit 105. The stabilizing circuit 105 comprises two systems of electromagnetic valves 106 and 107. One hydraulic-pressure supply portion 100 is provided for one atomic reactor plant. Pipes represented by pipes 109, 110, 111 and 112 are connected from the hydraulic-pressure supply portion 100 to a hydraulic-pressure control unit 108 which has pipes corresponding to those in the control rod driving apparatus 1. Water flows in the hydraulic-pressure supply portion 100 and in each pipe are designated by arrows.

The pipe 109 is a charging pipe for an accumulator 113 which acts when the control rod is inserted to cope with an emergency so that the accumulator 113 is charged with high-pressure water. The accumulator 113 includes a piston 114. The lower portion of the piston 114 is connected to a nitrogen container 116 through a pipe 115. High-pressure nitrogen gas is enclosed in the nitrogen container 116. Reference numerals 117 and 118 respectively represent a scram inlet valve and a scram outlet valve which are closed in a usual state so that the accumulator 113 is maintained at a high pressure state. In response to a control rod emergency insertion signal, the valves 117 and 118 are opened so that the high-pressure water in the accumulator 113 flows through an insertion pipe 119 connected to the lower surface of a drive piston of the control rod driving apparatus 1 so as to flow in the control rod driving apparatus 1. On the other hand, waste water discharged through the top surface of the drive piston flows to a withdrawing pipe 120 to flow through the scram outlet valve 118 so as to flow to a discharge container 121. As a result, a control rod is inserted into the reactor core to cope with the emergency.

The pipe 110 is a pipe for supplying water for driving the control rod when the output from a reactor is adjusted, the pipe 110 being connected to a direction-control circuit 126 composed of four electromagnetic valves 122, 123, 124 and 125 disposed in the hydraulic-pressure control unit 108. The direction-control circuit 126 acts to change over the hydraulic-pressure supply line in accordance with insertion/withdrawal of the control rod when a pair of two electromagnetic valves is opened. The driving water flows through the electromagnetic valve 122 and an insertion pipe 119 to be supplied to the lower surface of the drive piston of the control rod driving apparatus 1. On the other hand, discharged water from the top surface of the drive piston flows through the withdrawal pipe 120 and the electromagnetic valve 124 so as to be discharged from the hydraulic-pressure control unit 108 through a water-discharge pipe 112, the discharged water then being joined together the pipe 111. When the control rod is withdrawn, the electromagnetic valves 123 and 125 are opened. The driving water flows through the electromagnetic valve 125 and the withdrawing pipe 120 so as to be supplied to the top surface of the drive piston. On the other hand, discharged water from the lower surface of the drive piston flows through the insertion pipe 119 and the electromagnetic valve 123 and is discharged from the hydraulic-pressure control unit 108 through the water-discharge pipe 112, the discharged water being then joined together the pipe 111.

The pipe 111 is a pipe for water for cooling the control rod driving apparatus 1 so that cooling water, the pressure of which is adjusted, always flows through the insertion pipe 119 to flow in the control rod driving apparatus 1.

The electromagnetic valves 106 and 107 of the stabilizing circuit 105 are opened in a usual state so that water of a quantity required for the insertion of the control rod flows through the electromagnetic valve 106 and water of a quantity required for the withdrawal of the same flows through the electromagnetic valve 107. As a result, water flows in a cooling-water header 127 as a portion of cooling water. In the stabilizing circuit 105, the electromagnetic valve 106 is closed when the control rod is inserted in a usual state so that water of a quantity, which is the same as the quantity of water flowing through the electromagnetic valve 106, flows to the control rod driving apparatus 1. When the control rod is withdrawn, the electromagnetic valve 107 is closed so that water of a quantity, which is the same as the quantity of water flowing through the electromagnetic valve 107, flows to the control rod driving apparatus 1. As a result, the stabilizing circuit 105 stabilizes the pressure of drive water.

The conventional control rod driving apparatus of the structure described above is required to remove its electric motor and spool piece and decompose the spool piece by a predetermined number in one year in order to periodically change the shaft sealing packing. The operations for removing the electric motor and the spool piece are performed in a lower portion of the reactor pressure vessel, thus causing a possibility of radiation exposure for operators due to reactor water having a high radiation dose.

A great number of people and a large amount of manufacturing labor are required to complete a series of the operations, and therefore, periodical inspection period cannot be completed in a short time. What is worse, the shaft sealing packing undesirably enlarges the start torque due to coagulation between the shaft sealing packing and the rotational shaft if the ball spindle is left for a long time without being rotated. In this case, there is a possibility that operation of the electric motor cannot be performed smoothly. All electric motors must therefore be inspected at each periodical inspection of the reactor in order to inspect the operations of the electric motors. Also the foregoing fact inhibits the periodical inspection being completed in a short period of time.

It should be noted that the reactor core is designed in such a manner that power-adjustment units are previously determined, only their control rods are moved in the reactor core and the control rods for the residual units are completely removed from the core when the reactor is operated for the purpose of lightening the labor for operators and of reducing the fuel consumption cost.

It is preferable that the control rods for the power-adjustment units are of a type capable of fine motion in the core and of precisely controlling the power from the reactor. On the other hand, the control rods for the units except the power-adjustment units must have a function with which they can be rapidly inserted into the core to shutdown the reactor in an emergency without a necessity of having a capability of the precise movement.

In order to improve the operational facility and to reduce the cost of the fuel, it is advantageous for a reactor of a type having the foregoing core structure to dispose a driving apparatus suitable for the functions required for the control rods.

However, the same drive method is, at present, employed in the control rod driving apparatus for all units, and it can be said that the optimum arrangement has not yet been made available. For example, the conventional control rod driving apparatus shown in FIG. 10 is able to precisely adjust and move the control rod by controlling the rotational angle of the spindle thereof. Therefore, the apparatus has a structure suitable to serve as the control rod driving apparatus for the power-adjustment unit. On the other hand, the control rod driving apparatus shown in FIG. 11 basically employs the step drive. Therefore, it is not an optimum structure to meet a desire of precisely driving the power-adjustment units, but it is preferable that the same is used in units except the power-adjustment units. Hence, it is most preferred to use the two types of the control rod driving apparatuses in a combined manner in the core to meet the corresponding objects. However, the combined use requires using both the electric power source and the hydraulic pressure source because different drive methods are employed. Since also the control methods are different between these two types, two types of control apparatuses are required, thus resulting in the system structure becoming too complicated. What is worse, the cost reduction capability is inferior to the case where the single-method control rod driving apparatuses are used. Thus, the combined use has not been employed at present.

SUMMARY OF THE INVENTION

An object of the present invention is to substantially eliminate the defects or drawbacks encountered in the prior art and to provide a control rod driving apparatus having a structure realizing excellent maintenance facility and reliability and being capable of simplifying the structure of an overall control rod driving system for driving the control rod driving apparatus.

This and other objects can be achieved according to the present invention by providing a control rod driving apparatus adapted to drive a control rod assembly for a nuclear reactor and disposed in a housing mounted to a reactor pressure vessel of the nuclear reactor, comprising:

a guide tube disposed in the housing;

a connection pipe disposed inside the guide tube coaxially therewith and having one end to which a control rod assembly is connected;

a ball spindle disposed inside the connection pipe and supported thereby so as to be rotatable;

a ball nut assembly to be engaged with the ball spindle so as to be axially movable along the ball spindle, the ball nut assembly supporting another end of the connection pipe;

a hydraulic drive means operatively connected to the ball spindle to rotate the ball spindle; and a transmission means operatively connected to the drive means for transmitting power of the drive means to the ball spindle, wherein when the hydraulic drive means is driven, the ball spindle is rotated, the ball nut assembly engaged with the ball spindle is axially rotated, and the connection pipe supported by the ball nut assembly is then driven vertically to thereby drive the control rod assembly for inserting or withdrawing the same into or from a reactor core.

In preferred embodiments, the hydraulic drive means is a turbine-type hydraulic motor unit. The turbine-type hydraulic motor unit comprises a motor case, a first hydraulic motor for inserting the control rod assembly into the reactor core and a second hydraulic motor for withdrawing the control rod assembly from the reactor core. The transmission means comprises first bevel gear means operatively connected to either one of the hydraulic motors for insertion and withdrawal of the control rod assembly and worm gear means operatively connected to the ball spindle.

The hydraulic motor unit is driven by a pressure of driving water, and discharge water of the driving water after driving is discharged to a portion, having a pressure lower than an inner pressure inside the reactor pressure vessel, outside the reactor pressure vessel, through a discharge pipe connected to the hydraulic motor unit.

The driving water is introduced into the hydraulic motor unit by means of a hydraulic pressure supply pipe through which the pressure in the reactor pressure vessel is applied thereto. A change-over valve is disposed at an intermediate portion of the hydraulic pressure supply pipe, the change-over valve having a structure capable of changing over flow of the driving water while enabling at least two operations of the control rod insertion operation, the control rod withdrawal operation and an emergency control rod insertion operation. The change-over valve comprises an introduction port for introducing the driving water, a plurality of ports branched from the introduction port, spring means disposed inside the respective ports and a valve body opened and closed due to a balance between a force of the spring means and a hydraulic pressure transmitted through the introduction port. The change-over valve is disposed inside or outside the motor case of the hydraulic motor unit.

The turbine-type hydraulic motor unit comprises a single hydraulic motor of a structure capable of being reversibly operated for inserting the control rod assembly into the reactor core and for withdrawing the control rod assembly from the reactor core and wherein the transmission means comprises a bevel gear means operatively connected to the single hydraulic motor and a worm gear means operatively connected to the ball spindle.

In the above embodiments, the nuclear reactor is a boiling water reactor in which four fuel assemblies are disposed in respective sections formed as a unit fuel assembly structure by a cross-shaped control rod and a plurality of such unit fuel assembly structures are arranged in a core of the boiling water reactor, the control rods being driven by a control rod driving system including control rod driving apparatus for driving control rods including a control rod for power-adjustment unit, the control rod driving apparatus having a screw-drive structure comprising a spindle in which a nut is allowed to engage with a mechanism for vertically moving the connection pipe for establishing connection with the control rods and another control rod driving apparatus for driving control rods for units except the power-adjustment unit which is formed into a hydraulic pressure piston drive structure comprising a mechanism for vertically moving a connection pipe for establishing connection with the control rod, a piston and a cylinder.

The screw drive structure is driven by a hydraulic motor. A source for supplying driving water for driving the hydraulic pressure piston drive structure and a source for supplying driving water for driving the screw drive structure are made to be a common hydraulic pressure supply apparatus. The control rod for the power-adjustment unit has a drive structure which simultaneously drives a plurality of the control rods.

According to the control rod driving apparatus of the structures and features described above, a power, which is generated by the hydraulic motor unit when the operation for inserting or withdrawing the control rod is performed, is transmitted to the ball spindle by the transmission mechanism. The ball spindle is rotated by the driving power of the hydraulic motor unit, and the rotations of the ball spindle vertically move the ball nut which is allowed to engage with the ball spindle. Thus, the control rod mounted on the ball nut can be inserted or withdrawn through the connection pipe.

The use of the hydraulic motor unit enables the shaft sealing portion to be omitted. Therefore, sliding portions are eliminated from the structure, thus simplifying the overall structure of the control rod driving system. The water discharged from the motor, which is rotated by the hydraulic pressure, is passed through a discharge pipe connected to the outside of the reactor pressure vessel for the reactor. The pressure in the reactor pressure vessel is used to drive the motor, which is rotated by the hydraulic pressure, thereby eliminating an external driving water source.

The change-over valve disposed at an intermediate position of the hydraulic-pressure supply pipe for supplying the hydraulic pressure to the hydraulic motor is used to select the water passage downstream from the change-over valve. As a result, the two or more operations such as of a control rod insertion operation, control rod withdrawal operation and control rod emergency insertion operation can be performed.

When the control rod driving system including the above control rod driving apparatus is accommodated in the boiling water reactor, the control rod driving apparatus for the power-adjustment unit is formed into the screw-drive structure suitable for the precise movement and the control rod driving apparatus for units except the power-adjustment units is formed into the hydraulic pressure piston drive structure. Therefore, the control rods can be operated so as to be adaptable to the functions of the core. As a result, the controllability of the reactor can be improved.

In such structure, in modification, all control rod driving apparatuses employ the hydraulic pressure driving structure. All driving water supply sources are connected to the common hydraulic pressure supply apparatus, thereby simplifying the structure of the driving source. The boiling water reactor employs simultaneous driving of the plurality of control rods for the power-adjustment units. Therefore, the operation mechanism provided for the drive source can be simplified and the operation can be facilitated.

Other and further objects, features and advantages of the present invention will be made more clear through the following descriptions made with reference to the accompanying drawings.

DESCRIPTION OF THE PREFERRED EMBODIMENTS

Preferred embodiments of the present invention will be described hereunder with reference to the accompanying drawings.

A first embodiment of a control rod driving apparatus according to the present invention will now be described with reference to FIG. 1.

Figure 1:
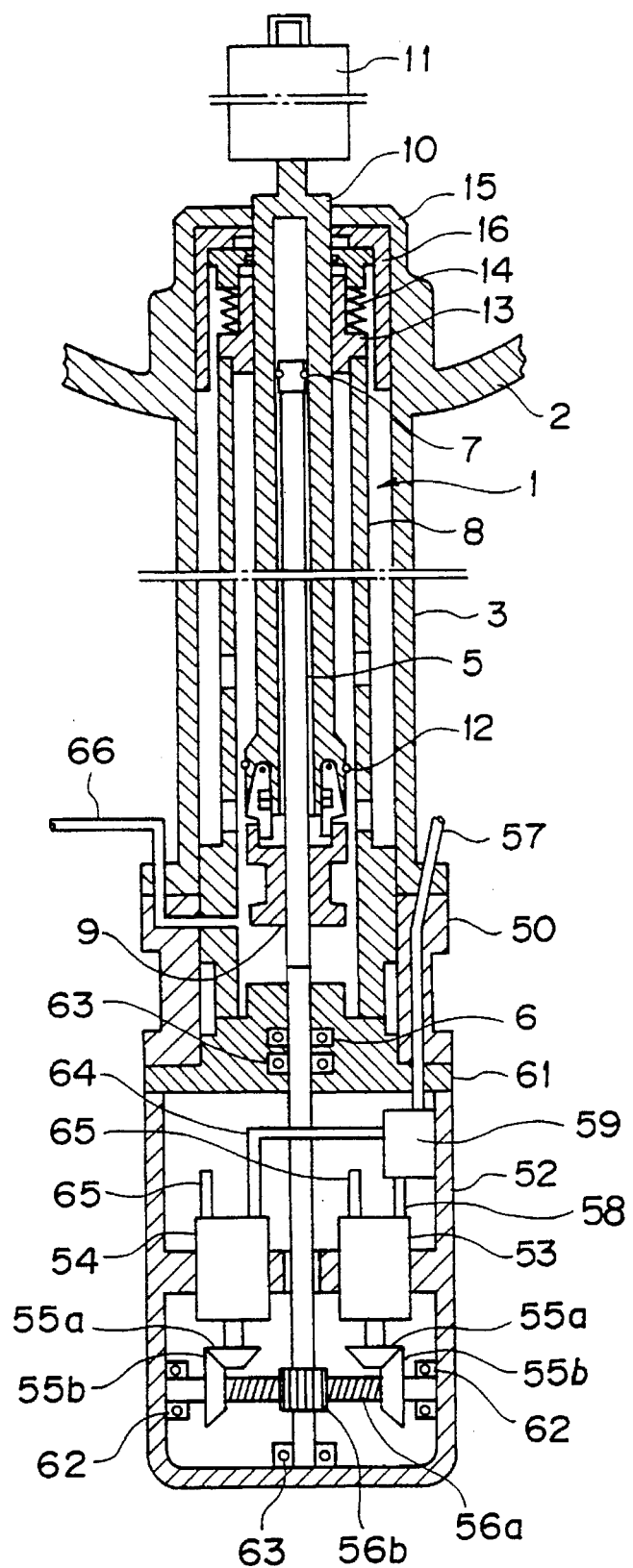
FIG. 1 is a vertical cross sectional view which illustrates a first embodiment of a control rod driving apparatus according to the present invention.
Figure 10:
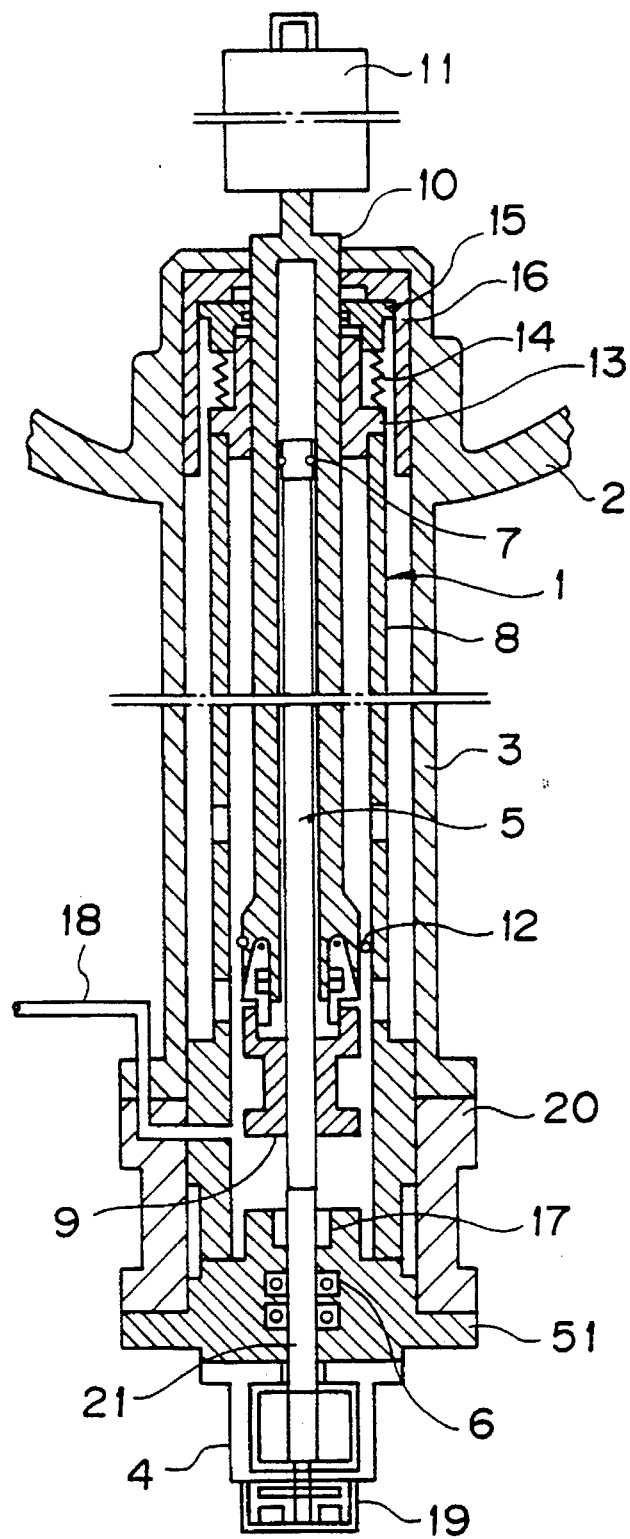
FIG. 10 is a vertical cross sectional view which illustrates one example of a conventional control rod driving apparatus.

Referring to FIG. 1, the same elements as those shown in FIG. 10 are given the same reference numerals and their descriptions are omitted here.

A hydraulic motor is accommodated in a motor case 52, the hydraulic motor comprising a hydraulic motor 53 for insertion, a hydraulic motor 54 for withdrawal, bevel gears 55a and 55b serving as transmission mechanisms to convert the direction of rotations of a driving shaft of the hydraulic motor so as to transmit the power to the ball spindle 5 and worm gears 56a and 56b.

For the hydraulic motor, one of a gear motor, a vane motor, a piston motor, a turbine motor and so forth may be employed. In this embodiment, the maintenance facility is improved by using a turbine-type hydraulic motor because it has a simple structure composed of small number of sliding elements and therefore its periodical maintenance labor requirements can be decreased.

If the normal revolving speed of the turbine-type hydraulic motor is higher than the revolving speed of the ball spindle 5 which is required to drive the control rod 11 in a steady state, the revolving speed is lowered by the worm gears 56a and 56b and the bevel gears 55a and 55b.

An embodiment in a case where the operational speed of the transmission mechanism is lowered will now be described.

Since the turbine-type hydraulic motor is generally designed in such a manner that its efficiency is improved when it is rotated forwards or reverse, this embodiment comprises a hydraulic motor 53 for insertion and hydraulic motor 54 for withdrawal which are used as the hydraulic motors to respectively insert and withdraw the control rod. When hydraulic pressure is applied to the hydraulic motor 53 for insertion for example, a rotational force is generated in a predetermined direction, the rotational force being transmitted from the bevel gear 55a supported by bearings 62 to the ball spindle 5 through the worm gear 56a disposed coaxially with the bevel gear 55b and the worm gear 56b supported by bearings 63. When the ball spindle 5 is rotated, the ball nut 9 allowed to engage with the ball spindle 5 is moved upwards. Simultaneously, the connection pipe 10 placed on the ball nut 9 is moved upwards. Therefore, the control rod 11 is inserted into the reactor core.

Since the turbine-type hydraulic motor has substantially no driven torque in general, another mechanism is required to maintain the positions of the control rod 11 and the connection pipe 10. In this embodiment, the engagement operation of the worm gear 56 maintains the positions of the control rod 11 and the connection pipe 10 even if a vertical force is applied to the same. Therefore, the electromagnetic brake required for the conventional control rod driving apparatus can be omitted from the structure.

It is preferable that the number of pipes for supplying hydraulic pressure to the hydraulic motor from the outside of the control rod driving apparatus is minimized in order to simplify the layout of pipes in the lower portion of the pressure vessel for the reactor. In this embodiment, the hydraulic pressure supplied from a hydraulic pipe 57 for driving is changed over by an electromagnetic valve 59 so that the hydraulic pressure is supplied to the hydraulic motor 53 for input and to the hydraulic motor 54 for output through a usual input port 68 and a usual outlet port 64.

In this embodiment, discharged water after the hydraulic pressure from the hydraulic motor 53 for input and the hydraulic motor 54 for output has been supplied is discharged into the reactor pressure vessel 2 through a discharge pipe 65. Water may be discharged by another method using a discharge pipe, not shown, communicated with the outside portion of the reactor pressure vessel. If the discharge pipe is provided, maintaining the pressure of the discharged water at a level lower than the pressure in the reactor enables the pressure in the reactor to be used as hydraulic pressure to drive the hydraulic motor. Therefore, the necessity of individually providing a source for driving the hydraulic motor on the outside of the control rod driving apparatus can be eliminated.

At the time of the scram, the hydraulic pressure is supplied to a hydraulic pipe 66 for scram operation so that the hydraulic pressure pushes up the connection pipe 10 mounted on the ball nut 9 in the guide tube 8 similarly to the conventional example. As a result, the connection pipe 10 is separated from the ball nut 9 so that scram operation is performed.

Although this embodiment has an arrangement such that the water supply at the time of scram operation is performed by means of the hydraulic pipe 66 for scram operation provided individually from the usual driving hydraulic pipe 57, the pipes may be used commonly by employing a structure in which the water passage is changed over by an electromagnetic valve or the like.

Figure 2:
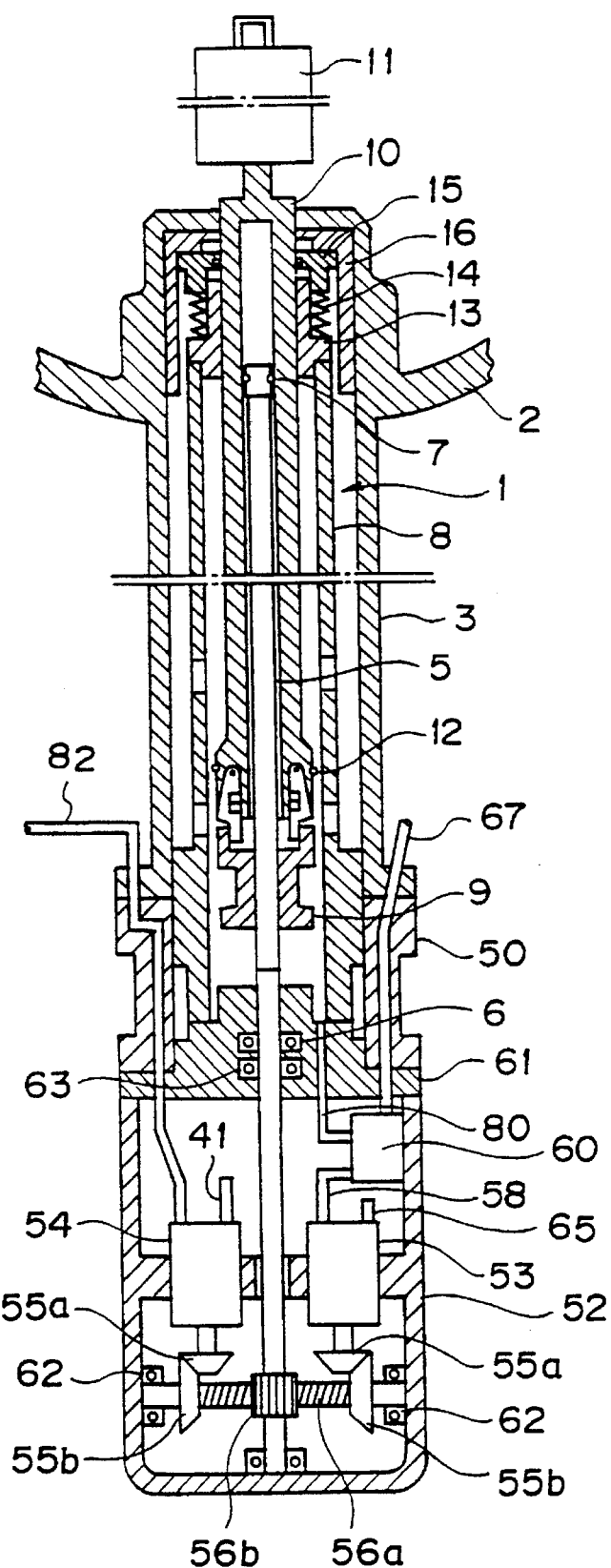
FIG. 2 is a vertical cross sectional view which illustrates a second embodiment of a control rod driving apparatus according to the present invention.

A second embodiment of the control rod driving apparatus will now be described with reference to FIGS. 2 and 3. Referring to FIG. 2, the same elements as those shown in FIG. 1 are given the same reference numerals and their descriptions are omitted here. The first embodiment has the arrangement in which the pipes for supplying hydraulic pressure for input/output at the time of usual operation of the control rod driving apparatus are formed into a common hydraulic pipe 57 for the usual operation and the electromagnetic valve 59 is used to change over the water passage downstream from the hydraulic pipe 57 for the usual operation. In this second embodiment, the pipes for supplying hydraulic pressure for the insertion operation at the time of the usual operation and those for scram operation are made so that a common introduction port 67 and a change-over valve 60 is disposed to change over the water passage downstream from the introduction port 67.

The change-over valve 60 automatically opens/closes the valve in accordance with the flow quantity and the level of the hydraulic pressure so as to change over the water passage for the insertion operation and that for scram operation. FIG. 3 is a schematic view which illustrates the inside portion of the switch valve 60. The change-over valve 60 accommodates valves 68 and 69 which are respectively pressed against valve seats 72 and 73 by springs 70 and 71, respectively. The spring force of the spring 70 is determined so as to be smaller than that of the spring 71.

If the hydraulic pressure acting on the introduction port 67 is low, only the valve 68 overcomes the spring force and is separated from the valve seat 72. As a result, the introduction port 67 and the usual insertion port 58 are communicated with each other. The insertion port 58 is communicated with the hydraulic motor 53 for insertion as shown in FIG. 2. Thus, usual insertion is performed similarly to that of the first embodiment.

Figure 3:
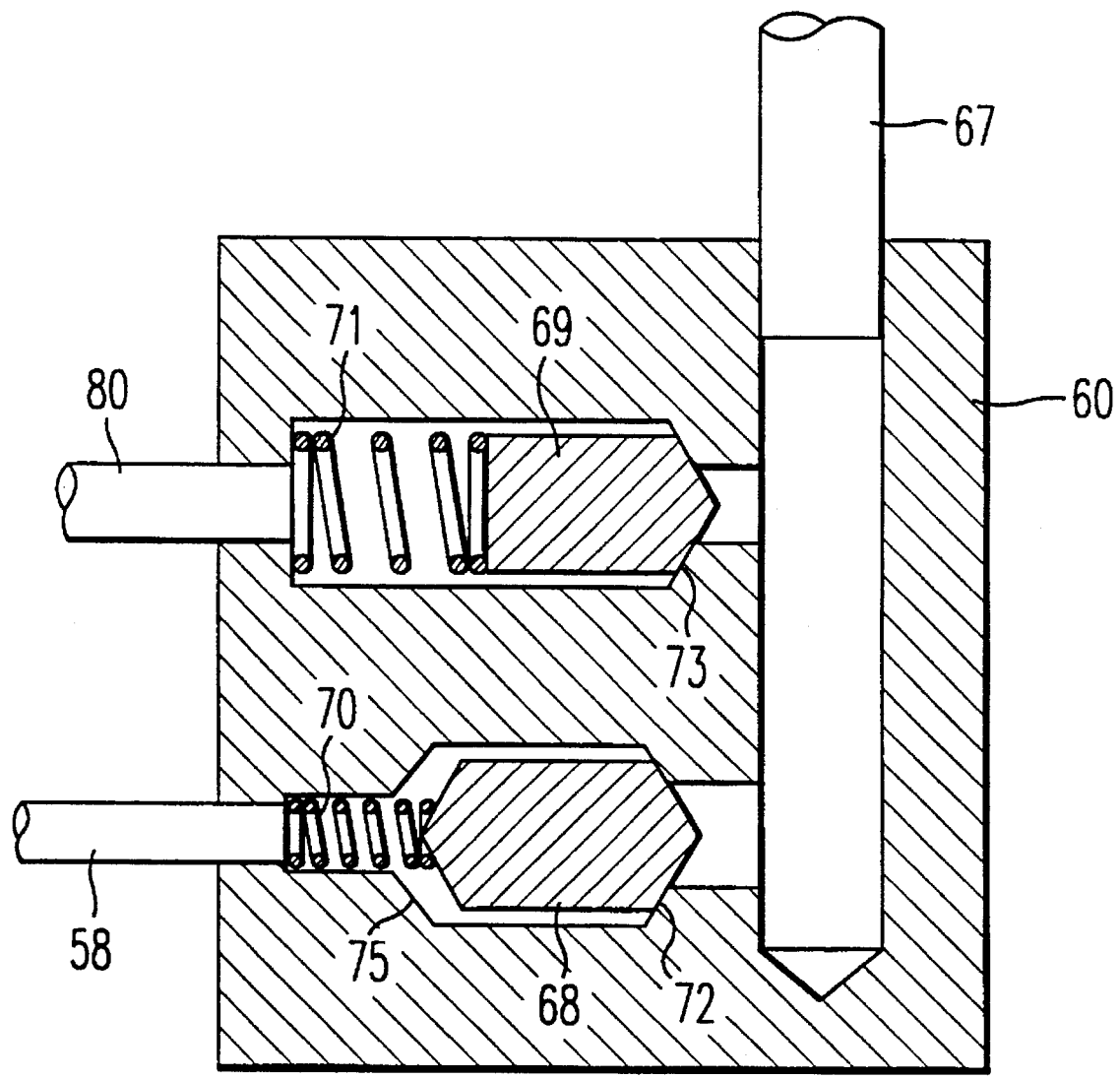
FIG. 3 is an enlarged vertical cross sectional view which illustrates a change-over valve shown in FIG. 2.

If the hydraulic pressure of the introduction port 67 shown in FIG. 3 is further raised, the valve 68 is pressed against the valve seat 75 by the hydraulic pressure so that communication between the introduction port 67 and the usual insertion port 58 is canceled. Furthermore, the valve 69 overcomes the spring force so as to be separated from the valve seat 73 so that the scram port 80 and the introduction port 67 are communicated with each other. The hydraulic pressure is supplied from the scram port 80 into the guide tube 8 shown in FIG. 2 so that scram is performed.

The withdrawal of the control rod 11 shown in FIG. 2 is performed by supplying the hydraulic pressure to a withdrawing pipe 82 to activate the hydraulic motor 54 for withdrawal.

In this embodiment, the pipe for supplying the hydraulic pressure for the insertion operation and that for the scram are formed commonly into the introduction port 67. It might be considered feasible to employ a contrary structure in which the pipe for supplying the hydraulic pressure for the withdrawal operation and that for scram are commonly formed. The foregoing case is undesirable because withdrawal operation is performed if the hydraulic pressure of water to be supplied at the time of scram is low.

Figure 4:
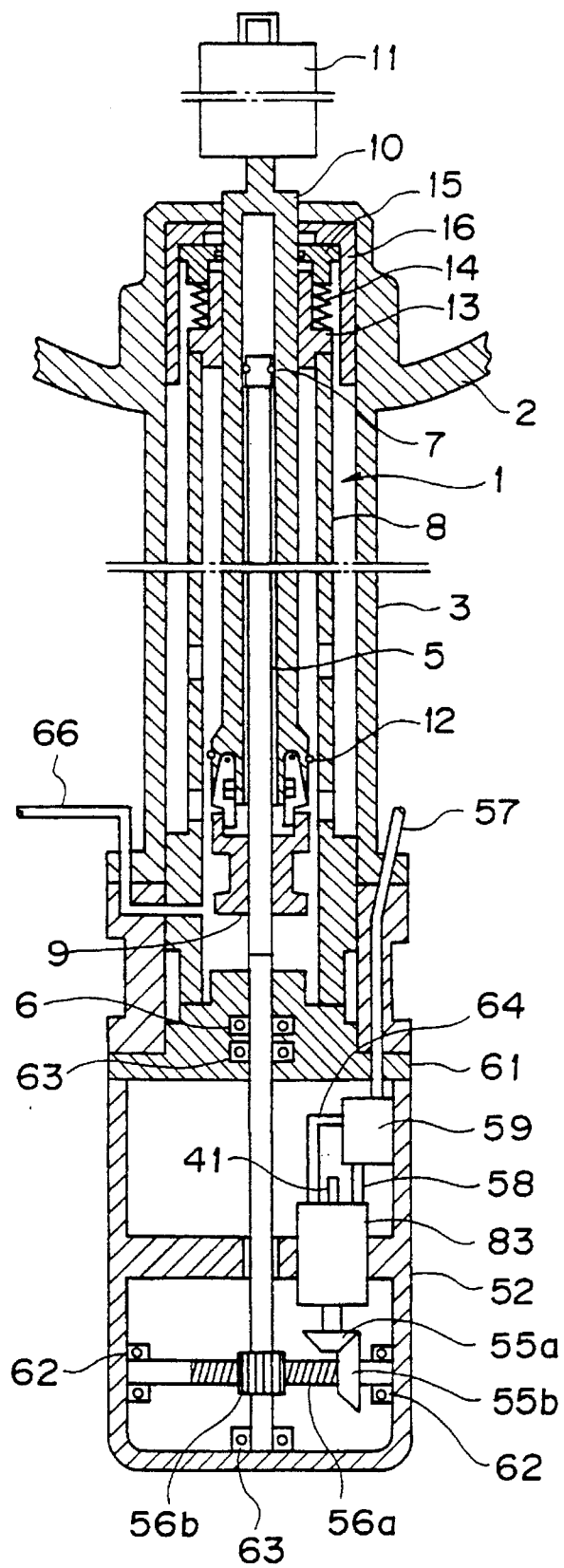
FIG. 4 is a vertical cross sectional view which illustrates a third embodiment of a control rod driving apparatus according to the present invention.

A third embodiment of the control rod driving apparatus according to the present invention will now be described with reference to FIG. 4. Referring to FIG. 4, the same elements as those shown in FIG. 1 are given by the same reference numerals and their descriptions are omitted here. This embodiment employs a turbine-type hydraulic motor 83 which can be rotated both forwards and reversely so that the number of the hydraulic motors is decreased to one. Both insertion and withdrawal of the control rod are performed by the turbine-type hydraulic motor 83. As for the scram, a similar arrangement is made to that according to the first embodiment.

Figure 5:
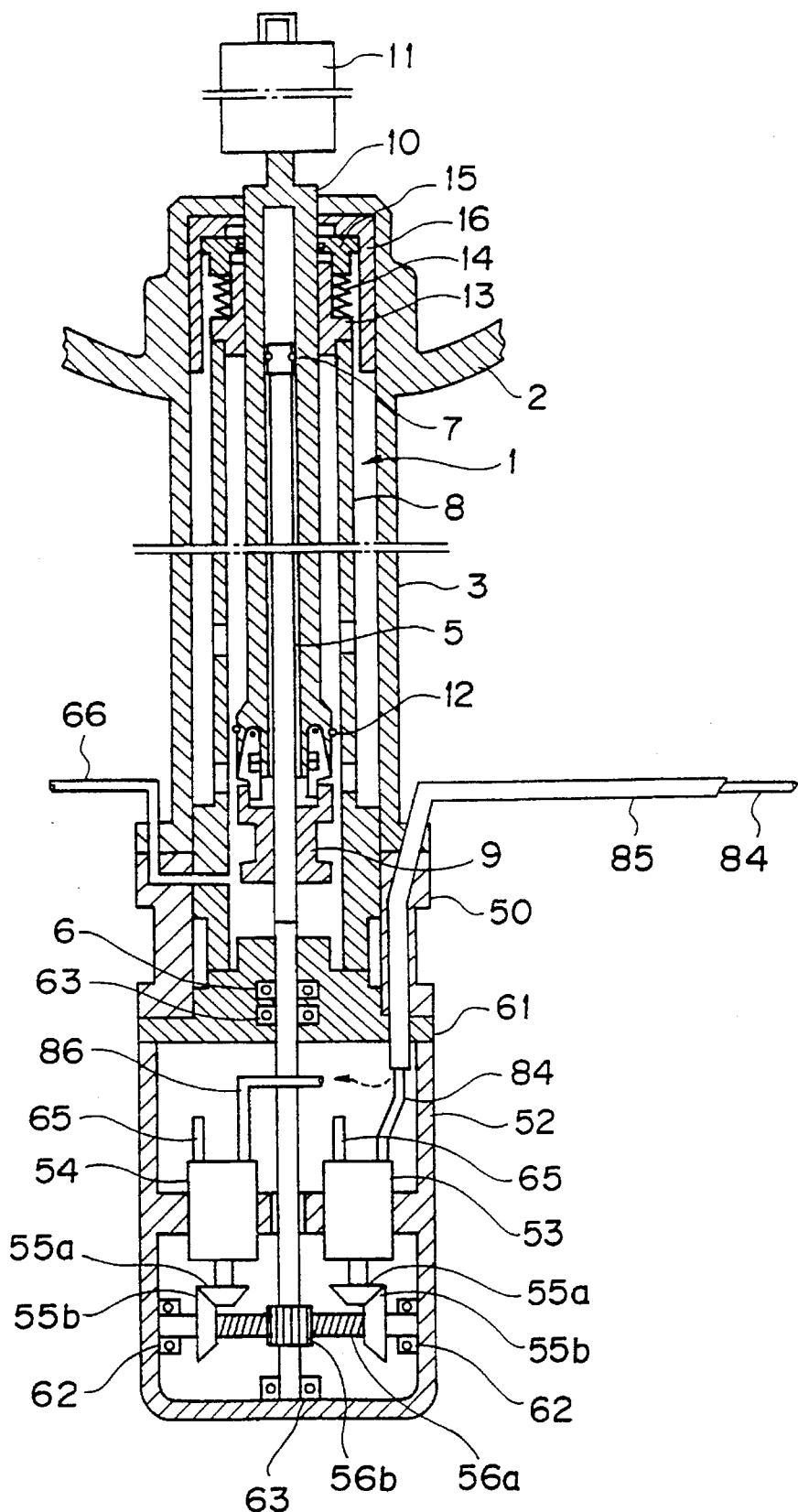
FIG. 5 is a vertical cross sectional view which illustrates a fourth embodiment of a control rod driving apparatus according to the present invention.

A fourth embodiment of the control rod driving apparatus according to the present invention will now be described with reference to FIG. 5. Referring to FIG. 5, the same elements as those shown in FIG. 1 are given the same reference numerals and their descriptions are omitted here. This embodiment has an arrangement that the hydraulic pipes are formed into a multi-pipe structure to decrease the number of the hydraulic pipes so as to simplify the layout of the pipes. The structure shown in FIG. 5 is an example having an arrangement in which a pipe 74 connected to the hydraulic motor 53 for insertion is accommodated in a pipe 85 so that a double-pipe structure is formed. A water flow through a gap between the pipe 85 and the pipe 84 flows through a pipe 86 to be introduced into the hydraulic motor 54 for withdrawal so that the hydraulic motor 54 for withdrawal is operated.

Scram operation is performed by supplying hydraulic pressure to the hydraulic pipe 66. The pipe for the scram operation and the pipe for the usual insertion may be formed into a multi-layer pipe to decrease the number of the pipes.

Figure 6:
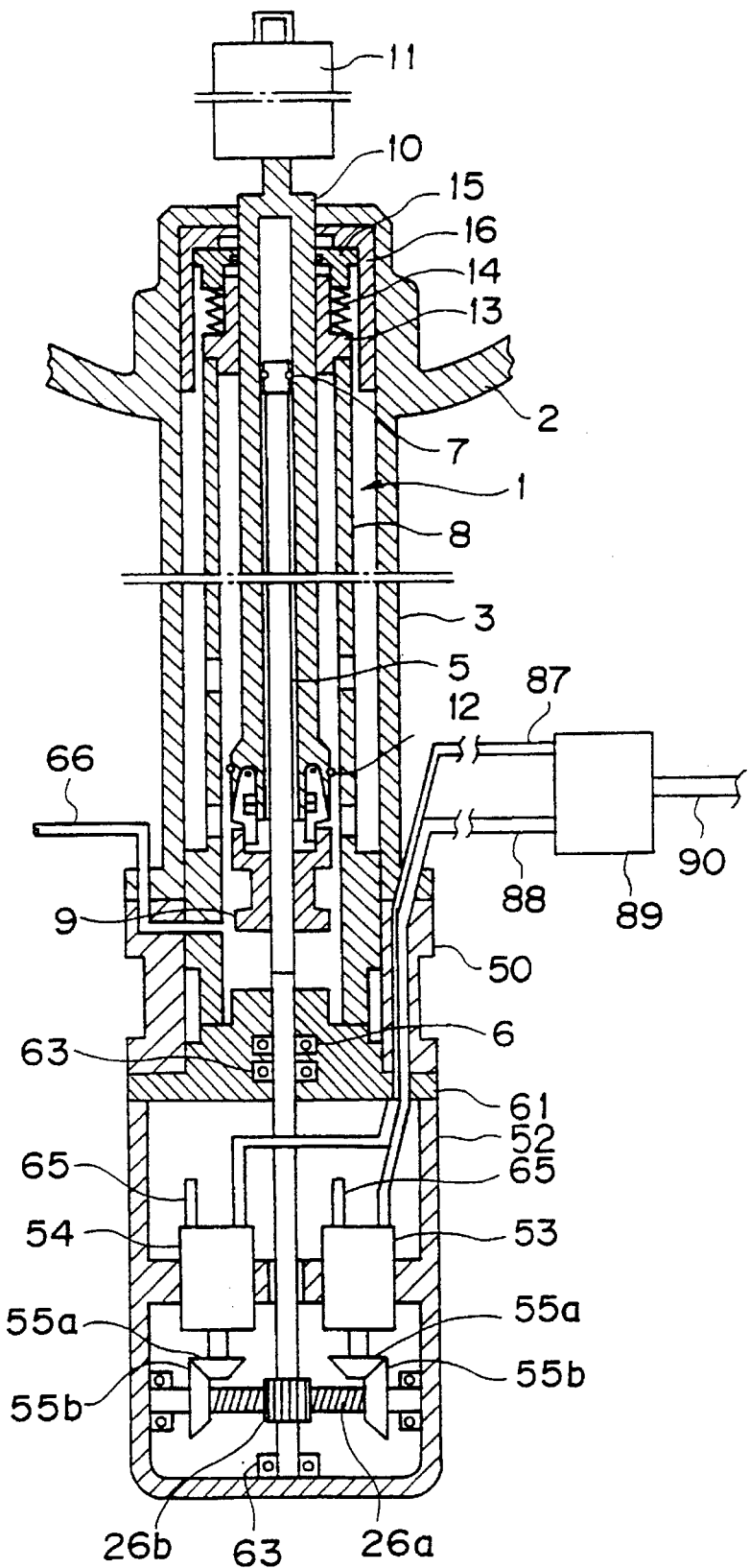
FIG. 6 is a vertical cross sectional view which illustrates a fifth embodiment of a control rod driving apparatus according to the present invention.

A fifth embodiment of the control rod driving apparatus according to the present invention will now be described with reference to FIG. 6. In this embodiment, the change-over valve accommodated in the motor case 52 in the first and third embodiments is disposed on the exterior of the motor case 52. A change-over valve 89 may be disposed at an arbitrary position, such as a position on the inside or outside of the pedestal in the lower portion of the reactor pressure vessel or on the outside of the reactor pressure vessel. The hydraulic pressure supplied through a pipe 90 is, by the change-over valve 89, connected to a usual outlet port 87 or a usual inlet port 88 in accordance with the drive mode so as to operate the hydraulic motor 53 for insertion or the hydraulic motor 54 for withdrawal.

In this embodiment, the number of pipes in the pedestal in the lower portion of the pressure vessel for the reactor is increased, resulting in an undesirable pipe layout. However, the ease of maintenance of the change-over valve 89 can be improved.

Further, the change-over valve according to the second embodiment may be disposed on the outside of the motor case 52.

Figure 7:
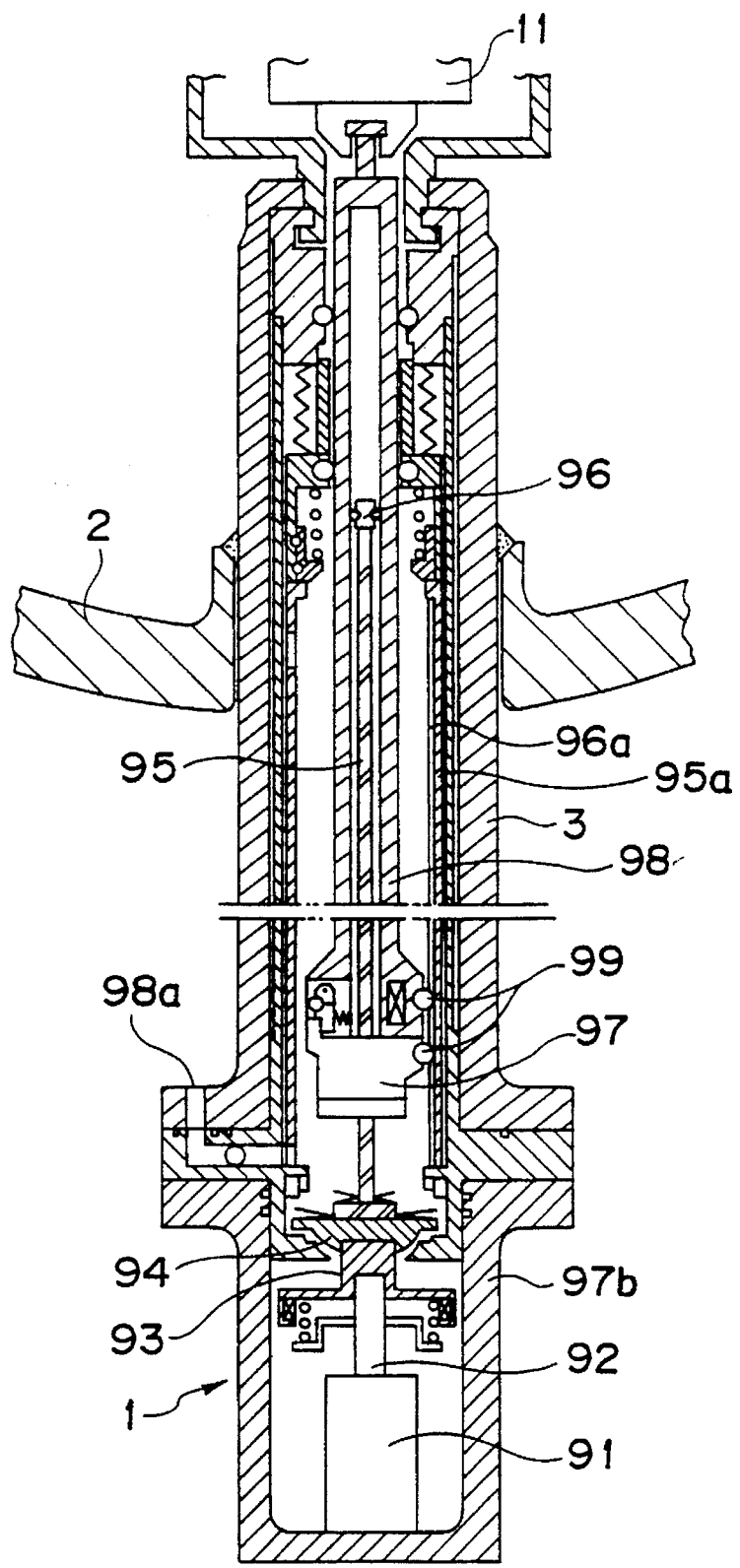
FIG. 7 is a vertical cross sectional view which illustrates a sixth embodiment of a control rod driving apparatus according to the present invention.

A sixth embodiment of the control rod driving apparatus according to the present invention will now be described with reference to FIG. 7. The control rod driving apparatus 1 is accommodated in the housing formed integrally with the pressure vessel 2 by welding. A first connection member 93 is attached to the upper portion of a drive shaft 92 which is rotated by a hydraulic motor 91. The drive shaft 92 penetrates a pressure boundary but has no shaft sealing packing. A second connection member 94 is attached to the first connection member 93. A long spindle 95 is connected to the upper portion of the second connection member 94, the spindle 95 having a bearing 96 attached to the top end thereof. The spindle 95 is rotated in synchronization with the drive shaft 92 when the hydraulic motor 91 is rotated.

A nut 97 is engaged to the spindle 95, the nut 97 having the top surface with which the lower end of a connection pipe 98 is in contact. Four rollers 99 equally disposed in the circumferential direction are provided for each of the nut 97 and the connection pipe 98, the rollers 99 being in contact with the inner surface of a guide tube 95a. The side surfaces of the rollers 99 are guided by a plate 96b attached to the inner surface of the guide tube 95a to inhibit rotation of the nut 97 and the connection pipe 98. Reference numeral 97b represents a housing.

In the control rod drive apparatus 1 constituted as described above, when the spindle 95 is rotated due to the rotations of the hydraulic motor 91, the nut 97 allowed to engage with the spindle 95 is permitted to move only in the axial direction. Therefore, the connection pipe 98 mounted on the nut 97 follows the movement of the nut 97, also causing the control rod 11 connected to the connection pipe 97 to be moved vertically.

If the control rod 11 is rapidly inserted, called a scram operation, during an emergency for the reactor, high-pressure water accumulated in an accumulator is supplied through the scram-water injection port 98a to be introduced into the guide tube 95a. As a result, high-pressure water acts on the connection pipe 98 to rapidly pushes the connection pipe 98 in the upward direction. Therefore, the control rod 11 is rapidly inserted into the reactor core.

Figure 8:
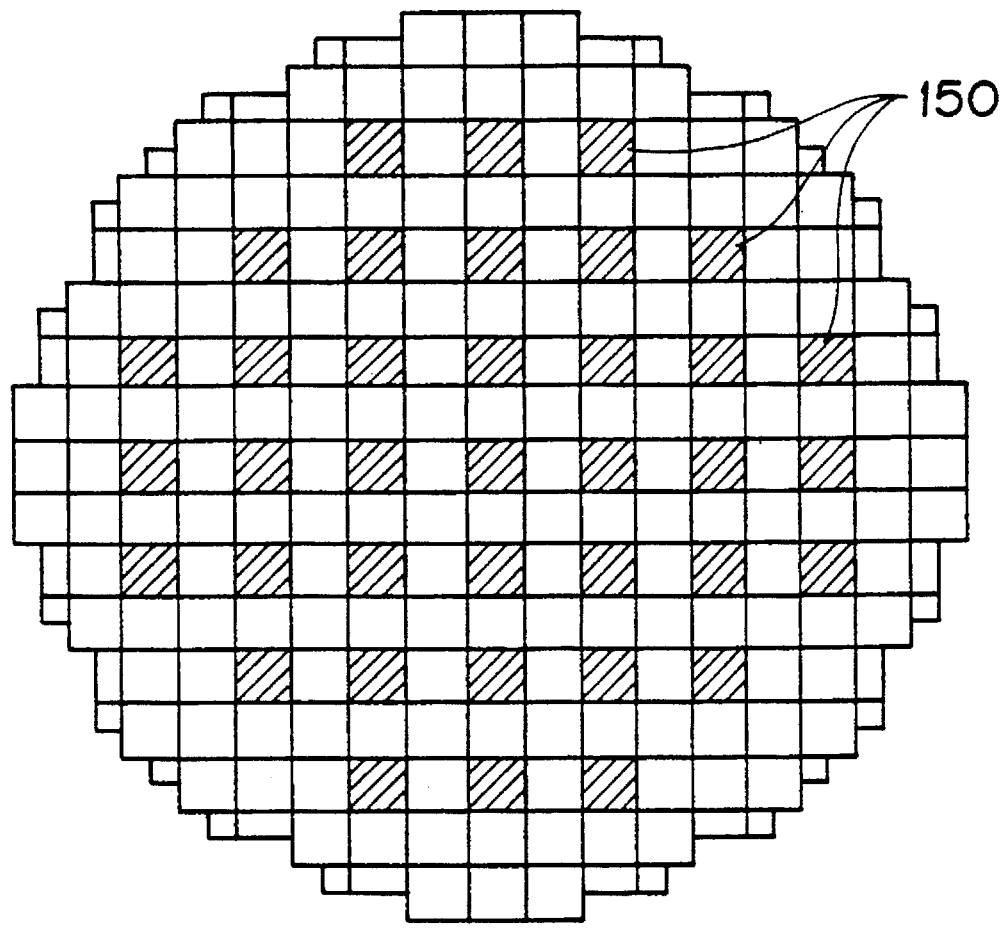
FIG. 8 is a lateral cross sectional view which illustrates the structure of a reactor core according to the present invention.

A control rod driving system including a plurality of control rod driving apparatus of the structures described above will be preferably accommodated in a boiling water reactor BWR according to the present invention, which will be described hereunder. FIG. 8 illustrates the structure of a reactor core comprising a plurality of power-adjustment units 150 as designated by diagonal lines.

As a control rod driving apparatus for the power-adjustment units 150, any one of the apparatuses according to the first to sixth embodiments is employed. Since the control-rod drive apparatus 1 having the foregoing drive structure causes the control rod 11 to move upwards or downwards in accordance with the rotational angle of the spindle 5 or 95, the control rod 11 can be precisely moved in the core by controlling the rotational angle of the spindle 5 or 95. Therefore, its structure is suitable as a method for driving the control rods for the power adjustment units.

Figure 11:
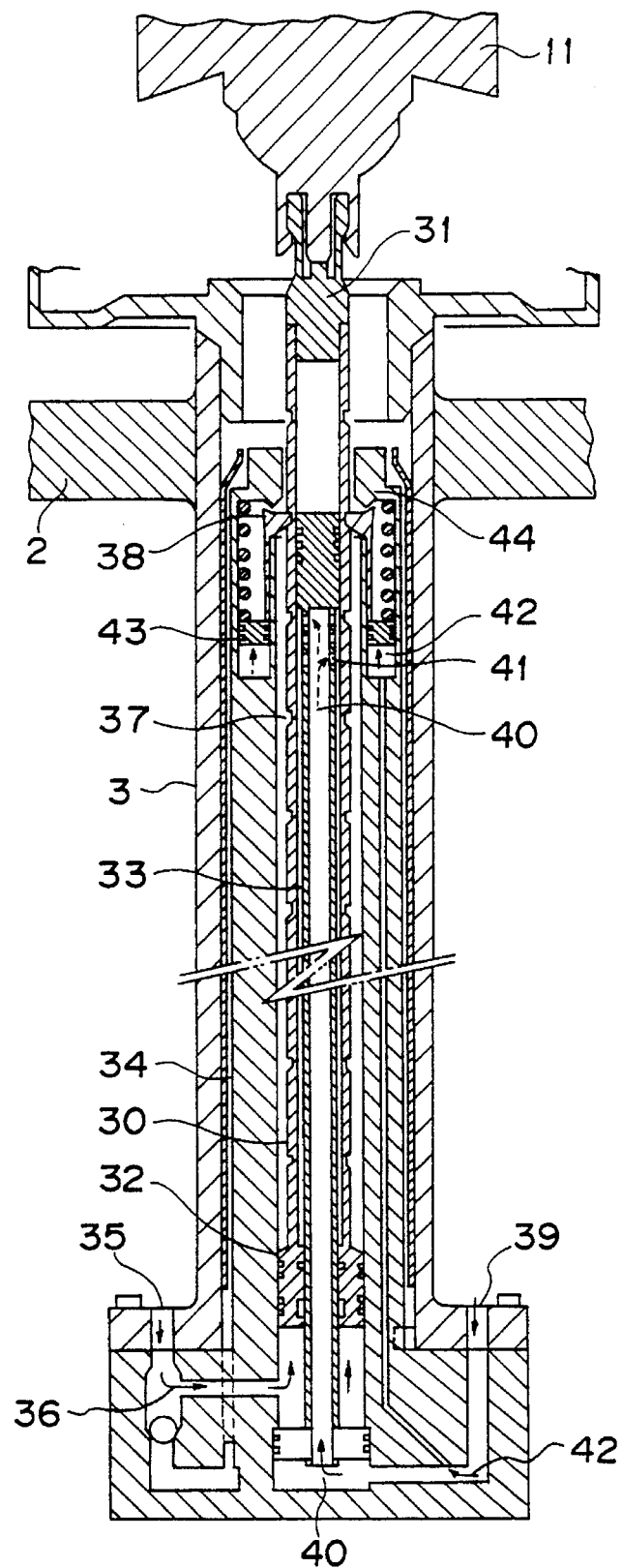
FIG. 11 is a vertical cross sectional view which illustrates another example of a conventional control rod driving apparatus.

The control rod driving apparatus for units except the power adjustment units comprises the control rod driving apparatus having the hydraulic piston drive structure shown in FIG. 11.

An example of a system for supplying hydraulic pressure for driving the foregoing control rod driving apparatus will now be described.

Figure 12:
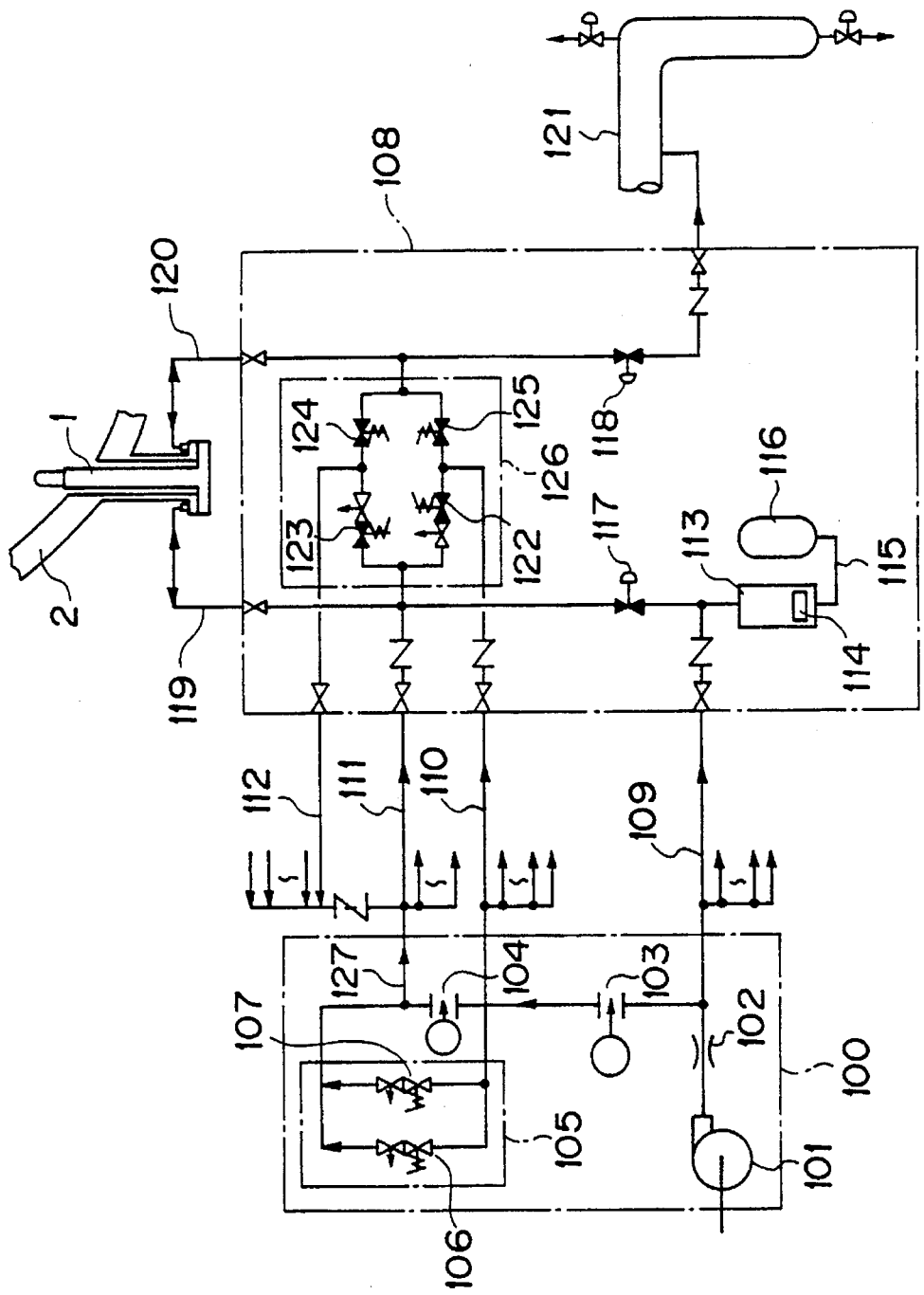
FIG. 12 is a schematic system view which illustrates a hydraulic pressure supply system for driving the conventional control rod driving apparatus.

Among the hydraulic pressure supply systems according to the present invention, the control rod driving apparatus having the hydraulic piston drive structure adapted to units except the power adjustment units 150 comprises the conventional hydraulic pressure supply system shown in FIG. 12. In this case, the conventional structure comprises one stabilizing circuit 105, causing the control rods to be driven one by one. In this embodiment, a plurality of the stabilizing circuits 105 may be provided to enable a plurality of control rods to be driven simultaneously.

Figure 9:
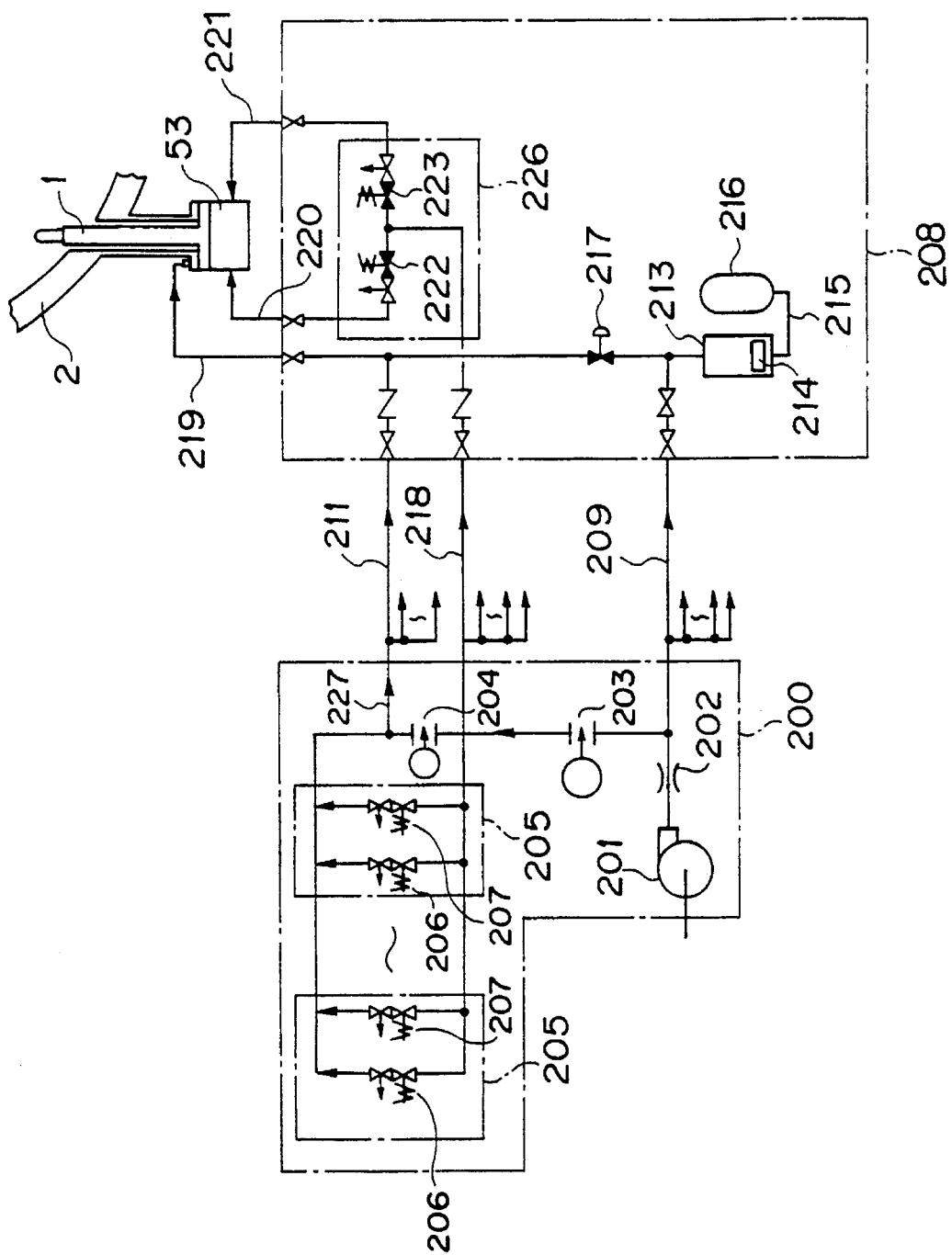
FIG. 9 is a schematic system view which briefly illustrates an example of a hydraulic pressure supply system for use in the present invention for driving the control rod driving apparatus for adjusting the power.

FIG. 9 illustrates an embodiment of a system for supplying hydraulic pressure to a control rod driving apparatus of a screw-drive type hydraulic drive motor for use in the power adjustment units. It should be noted that a pump 201 of a hydraulic supply portion 200 shown in FIG. 9 may be commonly used with the pump 101 shown in FIG. 12.

The hydraulic pressure supply portion 200 has a pipe structure comprising a pump 201, a flow meter 202, a flow-rate adjustment valve 203, a pressure-adjustment valve 204 and a plurality of stabilizing circuits 205. Each stabilizing circuit 205 comprises two systems of electromagnetic valves 206 and 207. One hydraulic-pressure supply portion 200 is provided for one nuclear reactor plant. Pipes represented by pipes 209, 210 and 211 are connected from the hydraulic-pressure supply portion 200 to a hydraulic-pressure control unit 208 which has pipes corresponding to those in the control rod driving apparatus 1. Water flows in the hydraulic-pressure supply portion 200 and in each pipe are designated by arrows.

The pipe 209 is a charging pipe for an accumulator 213 which acts when the control rod is inserted to cope with an emergency so that the accumulator 213 is charged with high-pressure water. The accumulator 213 includes a piston 214. The lower portion of the piston 214 is connected to a nitrogen container 216 through a pipe 215. High-pressure nitrogen gas is enclosed in the nitrogen container 216. Reference numeral 217 represents a scram valve which is closed in a usual state so that the accumulator 213 is maintained at a high pressure state. In response to a control-rod emergency insertion signal, the scram valve 217 is opened so that the high-pressure water in the accumulator 213 flows through a scram pipe 219 connected to the lower surface of a connection pipe of the control rod driving apparatus 1 so as to flow in the control rod driving apparatus 1. As a result, a control rod is inserted into the reactor core to cope with emergency. It should be noted that the control rod driving apparatus 1 of the screw-drive structure does not involve scram discharge water.

The pipe 210 is a pipe for supplying water for driving the control rod when the output from a reactor is adjusted, the pipe 210 being connected to a direction—control circuit 226 composed of two electromagnetic valves 222 and 223 disposed in the hydraulic-pressure control unit 208. The direction-control circuit 226 acts to change over the rotational direction of the hydraulic drive motor in accordance with the insertion/withdrawal of the control rod. That is, the control rod is inserted by opening the electromagnetic valve 222 so that the driving water flows through the electromagnetic valve 222 and an insertion pipe 220. As a result, the hydraulic drive motor is rotated in a direction which causes the control rod to be inserted. When the control rod is withdrawn, the electromagnetic valve 223 is opened. The driving water flows through the electromagnetic valve 223 and the withdrawing pipe 221 so as to rotate the hydraulic drive motor in a direction which causes the control rod to be withdrawn. In both insertion and withdrawal, drive water rotates the hydraulic drive motor and flows in the pressure vessel 2 through the control-rod drive apparatus 1.

The pipe 211 is a purge-water pipe for preventing invasion of foreign materials from the inside portion of the pressure vessel 2 into the control rod driving apparatus 1 so that purge water, the pressure of which has been adjusted to a predetermined level in the purge-water pipe, always flow through the scram pipe 219 to flow in the control rod driving apparatus 1.

The electromagnetic valves 206 and 207 of the stabilizing circuit 205 are opened in a usual state so that a quantity required for the insertion of the control rod flows through the electromagnetic valve 206 and a quantity required for the withdrawal of the same flows through the electromagnetic valve 207. As a result, water flows in a purge-water header 227 as a portion of purging water.

In the stabilizing circuit 205, the electromagnetic valve 206 is closed when the control rod is inserted to adjust the output so that a quantity of water, which is the same as the quantity of water flowing through the electromagnetic valve 206, flows to the hydraulic drive motor. When the control rod is withdrawn, the electromagnetic valve 207 is closed so that a quantity of water, which is the same as the quantity of water flowing through the electromagnetic valve 207, flows to the hydraulic drive motor. Thus, the stabilizing circuit 205 stabilizes the pressure of drive water similarly to that of the conventional example. Furthermore, a plurality of the stabilizing circuits 205 are provided, thereby simultaneously and stably driving a plurality of control rods. By simultaneously driving control rods of the power adjustment units located at symmetric positions with respect to the central unit in the core for example, the power from the core can be adjusted in such a manner that the symmetry of the distribution of the powers from the core is maintained.

By providing a plurality of the stabilizing circuit 205 for the control rod driving apparatus having the hydraulic piston structure as described above, the control rods can be driven similarly in such a manner that the symmetry of the distribution of the powers is maintained.

As described above, the control rod driving apparatus according to the present invention comprises a motor which is driven by hydraulic pressure in place of a conventional electric motor so that the necessity of using the shaft sealing packing for the ball spindle can be eliminated and elements which must be periodically changed can be omitted. Therefore, the amount of maintenance required for the control rod driving apparatus can be significantly reduced. As a result, a reduction in the quantity of exposure for operators when a reactor is periodically inspected can be achieved. In addition, it contributes to shorten the time required to complete the latter period of the periodical inspection.

Since the shaft sealing portion is omitted from the structure, the drive torque can be reduced and normal operation can be always expected. In addition, the possibility of discharge of the reactor water to the outside of the reactor can be eliminated. As a result, a great contribution can be made to improve the reliability and safety of the reactor.

Since the operation of the worm gear maintains the position of the control rod even if external force for vertically moving the control rod acts, the electromagnetic brake, which has been used to prevent the withdrawal of the control rod when a pipe has been broken, can be omitted from the structure.

The foregoing boiling water reactor BWR equipped with the control rod driving system according to the present invention enables the control rod to be operated to be adaptable to the function of the core. Therefore, a great contribution can be made to improve controllability of the BWR. By using the motor driven by hydraulic pressure in the control rod driving apparatus of the output adjustment units in place of the conventional electric motor, the necessity of using the shaft sealing packing for the spindle can be eliminated. In addition, the same hydraulic pressure supply system as that for the control rod driving apparatus, except for the power adjustment units, is employed. Therefore, the system can be simplified and a great economical effect can be obtained.

Although the present invention has been described hereinbefore in the preferred forms, it is understood that the present disclosure of the preferred forms may be changed or modified in the details of construction, and the combination and arrangement thereof may be resorted to without departing from the spirit and the scope of the appended claims.

What is claimed is:

1. A control rod driving apparatus driving a control rod assembly of a nuclear reactor and disposed in a housing mounted to a reactor pressure vessel of the nuclear reactor, which comprises:

a guide tube disposed in the housing;

a connection pipe disposed inside the guide tube coaxially therewith and having a first end to which a control rod assembly is connected;

a ball spindle disposed inside the connection pipe and supported thereby so as to be rotatable;

a ball nut assembly engaged with the ball spindle so as to be axially movable along the ball spindle, said ball nut assembly supporting a second end of the connection pipe;

a hydraulic motor unit operatively connected to the ball spindle so as to rotate the ball spindle and including a motor case, a first hydraulic motor inserting the control rod assembly into the reactor core and a second hydraulic motor withdrawing the control rod assembly from the reactor core; and transmission means operatively connected to the hydraulic motor unit and transmitting power from the motor unit to the ball spindle, said transmission means comprising worm gear means operatively connected to the ball spindle and reducing the speed of rotation of the ball spindle and a first bevel gear means operatively connected to one of the hydraulic motors for insertion and withdrawal of the control rod assembly and, said worm gears means supporting the positions of the control rod assembly, wherein when the hydraulic motor unit is driven, the ball spindle is rotated, the ball nut assembly engaged with the ball spindle is axially rotated, and the connection pipe supported by the ball nut assembly is vertically driven to thereby drive the control rod assembly for inserting or withdrawing the control rod assembly into or from a reactor core.

2. A control rod driving apparatus according to claim 1, wherein a change-over valve is disposed at an intermediate portion of the hydraulic pressure supply pipe, said change-over valve having a structure changing over flow of the driving water while enabling at least two operations of the control rod insertion operation, said two operations comprising a control rod withdrawal operation and an emergency control rod insertion operation.

3. A control rod driving apparatus according to claim 2, wherein said change-over valve comprises an introduction port introducing the driving water, a plurality of ports branched from the introduction port, spring means disposed inside the respective ports and a valve body opened and closed due to a balance between a biasing force of the spring means and hydraulic pressure transmitted through the introduction port.

4. A control rod driving apparatus according to claim 1, wherein said hydraulic pressure supply pipe has a double-pipe structure.

5. A control rod driving apparatus driving a control rod assembly of a nuclear reactor and disposed in a housing mounted to a reactor pressure vessel of the nuclear reactor, which comprises:

a guide tube disposed in the housing;

a connection pipe disposed inside the guide tube coaxially therewith and having a first end to which a control rod assembly is connected;

a ball spindle disposed inside the connection pipe and supported thereby so as to be rotatable;

a ball nut assembly engaged with the ball spindle so as to be axially movable along the ball spindle, said ball nut assembly supporting a second end of the connection pipe;

a hydraulic motor unit operatively connected to the ball spindle so as to rotate the ball spindle and comprising a single hydraulic motor of a structure which is reversibly operable, said structure inserting the control rod assembly into the reactor core and withdrawing the control rod assembly from the reactor core and transmission means operatively connected to the hydraulic motor unit and transmitting power from the hydraulic motor unit to the ball spindle, said transmission means comprising a bevel gear means operatively connected to said single hydraulic motor and worm gear means operatively connected to the ball spindle, the worm gear means supporting the position of the control rod assembly, wherein when the hydraulic motor unit is driven, the ball spindle is rotated, the ball nut assembly engaged with the ball spindle is axially rotated, and the connection pipe supported by the ball nut assembly is driven vertically to thereby drive the control rod assembly for inserting or withdrawing the control rod assembly into or from a reactor core.

6. A control rod driving apparatus according to claim 1, wherein the nuclear reactor comprises a boiling water reactor and four fuel assemblies are disposed in respective sections formed as a unit fuel assembly structure by a cross-shaped control rod and wherein a plurality of such unit fuel assembly structures are arranged in a core of the boiling water reactor, the control rods being driven by a control rod driving system including a control rod driving apparatus which has a control rod for a power-adjustment unit, said control-rod drive apparatus having a screw-drive structure which includes a spindle in which a nut engages with a mechanism, said mechanism vertically moving the connection pipe and establishing connection with the control rods and another control rod driving apparatus for driving control rods for the units except the power-adjustment unit which is formed into a hydraulic pressure piston drive structure comprising a mechanism vertically moving a connection pipe and establishing connection with said control rod, a piston and a cylinder.

7. A control rod driving apparatus according to claim 6, wherein said screw drive structure is driven by a hydraulic motor.

8. A control rod driving apparatus according to claim 7, wherein a source supplying driving water for driving the hydraulic pressure piston drive structure and a source for supplying driving water driving said screw drive structure have a common hydraulic pressure supply apparatus.

9. A control rod driving apparatus according to claim 6, wherein the control rod for the power-adjustment unit includes a drive structure which simultaneously drives a plurality of control rods.

10. A control rod driving apparatus driving a control rod assembly of a nuclear reactor and disposed in a housing mounted to a reactor pressure vessel of the nuclear reactor, which comprises:

guide tube disposed in the housing;

a connection pipe disposed inside the guide tube coaxially therewith and having a first end to which a control rod assembly is connected;

a ball spindle disposed inside the connection pipe and supported thereby so as to be rotatable;

a ball nut assembly engaged with the ball spindle so as to be axially movable along the ball spindle, said ball nut assembly supporting a second end of the connection pipe;

a hydraulic motor unit operatively connected to the ball spindle so as to rotate the ball spindle and including a motor case, a first hydraulic motor inserting the control rod assembly into the reactor core and a second hydraulic motor withdrawing the control rod assembly from the reactor core; and a transmission operatively connected to the hydraulic motor unit and transmitting power from the motor unit to the ball spindle, said transmission comprising a first bevel gear operatively connected to one of the hydraulic motors for insertion and withdrawal of the control rod assembly and worm gear operatively connected to the ball spindle, the worm gear supporting the position of the control rod assembly, wherein when the hydraulic motor unit is driven, the ball spindle is rotated, the ball nut assembly engaged with the ball spindle is axially rotated, and the connection pipe supported by the ball nut assembly is vertically driven to thereby drive the control rod assembly for inserting or withdrawing the control rod assembly into or from a reactor core.

11. A control rod driving apparatus according to claim 10, wherein the driving water is introduced into the hydraulic motor unit by a hydraulic pressure supply pipe through which the pressure in the reactor pressure vessel is applied.

12. A control rod driving apparatus according to claim 11, wherein a change-over valve is disposed at an intermediate portion of the hydraulic pressure supply pipe, said change-over valve having a structure changing over flow of the driving water while enabling at least two operations of the control rod insertion operation, said two operations comprising a control rod withdrawal operation and an emergency control rod insertion operation.

13. A control rod driving apparatus according to claim 12, wherein said change-over valve comprises an introduction port introducing the driving water, a plurality of ports branched from the introduction port, a spring disposed inside the respective ports and a valve body opened and closed due to a balance between a biasing force of the spring and hydraulic pressure transmitted through the introduction port.

14. A control rod driving apparatus according to claim 11, wherein said hydraulic pressure supply pipe has a double-pipe structure.

15. A control rod driving apparatus driving a control rod assembly of a nuclear reactor and disposed in a housing mounted to a reactor pressure vessel of the nuclear reactor, which comprises:

guide tube disposed in the housing;

a connection pipe disposed inside the guide tube coaxially therewith and having a first end to which a control rod assembly is connected;

a ball spindle disposed inside the connection pipe and supported thereby so as to be rotatable;

a ball nut assembly engaged with the ball spindle so as to be axially movable along the ball spindle, said ball nut assembly supporting a second end of the connection pipe;

a hydraulic motor unit operatively connected to the ball spindle so as to rotate the ball spindle and comprising a single hydraulic motor of a structure which is reversibly operable, said structure inserting the control rod assembly into the reactor core and withdrawing the control rod assembly from the reactor core; and a transmission operatively connected to the hydraulic motor unit and transmitting power from the hydraulic motor unit to the ball spindle, said transmission comprising a bevel gear operatively connected to said single hydraulic motor and a worm gear operatively connected to the ball spindle, the worm gear supporting the position of the control rod assembly, wherein when the hydraulic motor unit is driven, the ball spindle is rotated, the ball nut assembly engaged with the ball spindle is axially rotated, and the connection pipe supported by the ball nut assembly is driven vertically to thereby drive the control rod assembly for inserting or withdrawing the control rod assembly into or from a reactor core.

16. A control rod driving apparatus according to claim 10, wherein the nuclear reactor comprises a boiling water reactor and four fuel assemblies are disposed in respective sections formed as a unit fuel assembly structure by a cross-shaped control rod and wherein a plurality of such unit fuel assembly structures are arranged in a core of the boiling water reactor, the control rods being driven by a control rod driving system including a control rod driving apparatus which has a control rod for a power-adjustment unit, said control-rod drive apparatus having a screw-drive structure which includes a spindle in which a nut engages with a mechanism, said mechanism vertically moving the connection pipe and establishing connection with the control rods and another control rod driving apparatus for driving control rods for the units except the power-adjustment unit which is formed into a hydraulic pressure piston drive structure comprising a mechanism vertically moving a connection pipe and establishing connection with said control rod, a piston and a cylinder.

17. A control rod driving apparatus according to claim 16, wherein said screw drive structure is driven by a hydraulic motor.

18. A control rod driving apparatus according to claim 18, wherein a source supplying driving water for driving the hydraulic pressure piston drive structure and a source for supplying driving water driving said screw drive structure have a common hydraulic pressure supply apparatus.

19. A control rod driving apparatus according to claim 16, wherein the control rod for the power-adjustment unit includes a drive structure which simultaneously drives a plurality of control rods.

20. A control rod driving apparatus driving a control rod assembly of a nuclear reactor and disposed in a housing mounted to a reactor pressure vessel of the nuclear reactor, which comprises:

a guide tube disposed in the housing;

a connection pipe disposed inside the guide tube coaxially therewith and having a first end to which a control rod assembly is connected;

a ball spindle disposed inside the connection pipe and supported thereby so as to be rotatable;

a ball nut assembly engaged with the ball spindle so as to be axially movable along the ball spindle, said ball nut assembly supporting a second end of the connection pipe;

a hydraulic motor unit operatively connected to the ball spindle so as to rotate the ball spindle and including a motor case, a first hydraulic motor inserting the control rod assembly into the reactor core and a second hydraulic motor withdrawing the control rod assembly from the reactor core; and transmission means operatively connected to the hydraulic motor unit and transmitting power from the motor unit to the ball spindle, said transmission means comprising worm gear means operatively connected to the ball spindle and reducing the speed of rotation of the ball spindle and a first bevel gear means operatively connected to one of the hydraulic motors for insertion and withdrawal of the control rod assembly, the worm gears means supporting the positions of the control rod assembly, wherein when the hydraulic motor unit is driven, the ball spindle is rotated, the ball nut assembly engaged with the ball spindle is axially rotated, and the connection pipe supported by the ball nut assembly is vertically driven to thereby drive the control rod assembly for inserting or withdrawing the control rod assembly into or from a reactor core, the nuclear reactor comprises a boiling water reactor and four fuel assemblies are disposed in respective sections formed as a unit fuel assembly structure by a cross-shaped control rod and wherein a plurality of such unit fuel assembly structures are arranged in a core of the boiling water reactor, the control rods being driven by a control rod driving system including a control rod driving apparatus which has a control rod for a power-adjustment unit, said control, rod drive apparatus having a screw-drive structure which includes a spindle in which a nut engages with a mechanism, said mechanism vertically moving the connection pipe and establishing connection with the control rods and another control rod driving apparatus driving control rods for the units except the power-adjustment unit which is formed into a hydraulic pressure piston drive structure comprising a mechanism vertically moving a connection pipe and establishing connection with said control rod, a piston and a cylinder wherein said screw drive structure is driven by a hydraulic motor, and a source supplying driving water driving the hydraulic pressure piston drive structure and a source supplying driving water driving said screw drive structure have a common hydraulic pressure supply apparatus; and wherein the control rod for the power-adjustment unit includes a drive structure which simultaneously drives a plurality of control rods.

21. A control rod driving apparatus driving a control rod assembly of a nuclear reactor and disposed in a housing mounted to a reactor pressure vessel of the nuclear reactor, which comprises:

a guide tube disposed in the housing;

a connection pipe disposed inside the guide tube coaxially therewith and having a first end to which a control rod assembly is connected;

a ball spindle disposed inside the connection pipe and supported thereby so as to be rotatable;

a ball nut assembly engaged with the ball spindle so as to be axially movable along the ball spindle, said ball nut assembly supporting a second end of the connection pipe;

a hydraulic motor unit operatively connected to the ball spindle so as to rotate the ball spindle and including a motor case, a first hydraulic motor inserting the control rod assembly into the reactor core and a second hydraulic motor withdrawing the control rod assembly from the reactor core; and transmission means operatively connected to the hydraulic motor unit and transmitting power from the motor unit to the ball spindle, said transmission means comprising worm gear means operatively connected to the ball spindle and reducing the speed of rotation of the ball spindle and a first bevel gear means operatively connected to one of the hydraulic motors for insertion and withdrawal of the control rod assembly, the worm gear means supporting the positions of the control rod assembly, wherein when the hydraulic motor unit is driven, the ball spindle is rotated, the ball nut assembly engaged with the ball spindle is axially rotated, and the connection pipe supported by the ball nut assembly is vertically driven to thereby drive the control rod assembly for inserting or withdrawing the control rod assembly into or from a reactor core;

a hydraulic pressure supply pipe supplying driving water to the hydraulic motor unit wherein a change-over valve is disposed at an intermediate portion of the hydraulic pressure supply pipe, said change-over valve having a structure changing over flow of the driving water while enabling at least two operations of the control rod insertion operation, said two operations comprising a control rod withdrawal operation and an emergency control rod insertion operation and said change-over valve comprises an introduction port introducing the driving water, a plurality of ports branched from the introduction port, spring means disposed inside the respective ports and a valve body opened and closed due to a balance between a biasing force of the spring means and hydraulic pressure transmitted through the introduction port.

22. A control rod driving apparatus driving a control rod assembly of a nuclear reactor and disposed in a housing mounted to a reactor pressure vessel of the nuclear reactor, which comprises:

a guide tube disposed in the housing;

a connection pipe disposed inside the guide tube coaxially therewith and having a first end to which a control rod assembly is connected;

a ball spindle disposed inside the connection pipe and supported thereby so as to be rotatable;

a ball nut assembly engaged with the ball spindle so as to be axially movable along the ball spindle, said ball nut assembly supporting a second end of the connection pipe;

a hydraulic motor unit operatively connected to the ball spindle so as to rotate the ball spindle and including a motor case, a first hydraulic motor inserting the control rod assembly into the reactor core and a second hydraulic motor withdrawing the control rod assembly from the reactor core; and transmission means operatively connected to the hydraulic motor unit and transmitting power from the motor unit to the ball spindle, said transmission means comprising worm gear means operatively connected to the ball spindle and reducing the speed of rotation of the ball spindle and a first bevel gear means operatively connected to one of the hydraulic motors for insertion and withdrawal of the control rod assembly, the worm gear means supporting the positions of the control rod assembly, wherein when the hydraulic motor unit is driven, the ball spindle is rotated, the ball nut assembly engaged with the ball spindle is axially rotated, and the connection pipe supported by the ball nut assembly is vertically driven to thereby drive the control rod assembly for inserting or withdrawing the control rod assembly into or from a reactor core and wherein driving water is introduced into the hydraulic motor by a hydraulic pressure supply pipe having a double-pipe structure.

23. A control rod driving apparatus driving a control rod assembly of a nuclear reactor and disposed in a housing mounted to a reactor pressure vessel of the nuclear reactor, which comprises:

a guide tube disposed in the housing;

a connection pipe disposed inside the guide tube coaxially therewith and having a first end to which a control rod assembly is connected;

a ball spindle disposed inside the connection pipe and supported thereby so as to be rotatable;

a ball nut assembly engaged with the ball spindle so as to be axially movable along the ball spindle, said ball nut assembly supporting a second end of the connection pipe;

a hydraulic motor unit operatively connected to the ball spindle so as to rotate the ball spindle and comprising a single hydraulic motor of a structure which is reversibly operable, said structure inserting the control rod assembly into the reactor core and withdrawing the control rod assembly from the reactor core; and transmission means operatively connected to the hydraulic motor unit and transmitting power from the hydraulic motor unit to the ball spindle, said transmission means comprising a bevel gear means operatively connected to said single hydraulic motor and a worm gear means operatively connected to the ball spindle, the worm gear means supporting the position of the control rod assembly, wherein when the hydraulic motor unit is driven, the ball spindle is rotated, the ball nut assembly engaged with the ball spindle is axially rotated, and the connection pipe supported by the ball nut assembly is driven vertically to thereby drive the control rod assembly for inserting or withdrawing the control into or from a reactor core, the nuclear reactor comprises a boiling water reactor and four fuel assemblies are disposed in respective sections formed as a unit fuel assembly structure by a cross-shaped control rod and wherein a plurality of such unit fuel assembly structures are arranged in a core of the boiling water reactor, the control rods being driven by a control rod driving system including a control rod driving apparatus which has a control rod for a power-adjustment unit, said control rod drive apparatus having a screw-drive structure which includes a spindle in which a nut engages with a mechanism, said mechanism vertically moving the connection pipe and establishing connection with the control rods and another control rod driving apparatus driving control rods for the units except the power-adjustment unit which is formed into a hydraulic pressure piston drive structure comprising a mechanism vertically moving a connection pipe and establishing connection with said control rod, a piston and a cylinder, wherein said screw drive structure is driven by said single hydraulic motor, a source supplying driving water driving the hydraulic pressure piston drive structure and a source supplying driving water driving said screw drive structure have a common hydraulic pressure supply apparatus, the source supplying driving water driving the hydraulic pressure piston drive structure and the source supplying driving water driving said screw drive structure have a common hydraulic pressure supply apparatus, and wherein the control rod for the power-adjustment unit includes a drive structure which simultaneously drives a plurality of control rods.

24. A control rod driving apparatus driving a control rod assembly of a nuclear reactor and disposed in a housing mounted to a reactor pressure vessel of the nuclear reactor, which comprises:

a guide tube disposed in the housing;

a connection pipe disposed inside the guide tube coaxially therewith and having a first end to which a control rod assembly is connected;

a ball spindle disposed inside the connection pipe and supported thereby so as to be rotatable;

a ball nut assembly engaged with the ball spindle so as to be axially movable along the ball spindle, said ball nut assembly supporting a second end of the connection pipe;

a hydraulic motor unit operatively connected to the ball spindle so as to rotate the ball spindle and comprising a single hydraulic motor of a structure which is reversibly operable, said structure inserting the control rod assembly into the reactor core and withdrawing the control rod assembly from the reactor core; and transmission means operatively connected to the hydraulic motor unit and transmitting power from the hydraulic motor unit to the ball spindle, said transmission means comprising bevel gear means operatively connected to said single hydraulic motor and a worm gear means operatively connected to the ball spindle, the worm gear means supporting the position of the control rod assembly, wherein when the hydraulic motor unit is driven, the ball spindle is rotated, the ball nut assembly engaged with the ball spindle is axially rotated, and the connection pipe supported by the ball nut assembly is driven vertically to thereby drive the control rod assembly for inserting or withdrawing the control into or from a reactor core, wherein driving water is introduced into the hydraulic motor unit by a hydraulic pressure supply pipe having a double-pipe structure.

25. A control rod driving apparatus driving a control rod assembly of a nuclear reactor and disposed in a housing mounted to a reactor pressure vessel of the nuclear reactor, which comprises:

a guide tube disposed in the housing;

a connection pipe disposed inside the guide tube coaxially therewith and having a first end to which a control rod assembly is connected;

a ball spindle disposed inside the connection pipe and supported thereby so as to be rotatable;

a ball nut assembly engaged with the ball spindle so as to be axially movable along the ball spindle, said ball nut assembly supporting a second end of the connection pipe;

a hydraulic motor unit operatively connected to the ball spindle so as to rotate the ball spindle and comprising a single hydraulic motor of a structure which is reversibly operable, said structure inserting the control rod assembly into the reactor core and withdrawing the control rod assembly from the reactor core; and transmission means operatively connected to the hydraulic motor unit and transmitting power from the hydraulic motor unit to the ball spindle, said transmission means comprising bevel gear means operatively connected to said single hydraulic motor and worm gear means operatively connected to the ball spindle, the worm gear means supporting the position of the control rod assembly, wherein when the hydraulic motor unit is driven, the ball spindle is rotated, the ball nut assembly engaged with the ball spindle is axially rotated, and the connection pipe supported by the ball nut assembly is driven vertically to thereby drive the control rod assembly for inserting or withdrawing the control rod assembly into or from a reactor core.

26. A control rod driving apparatus driving a control rod assembly of a nuclear reactor and disposed in a housing mounted to a reactor pressure vessel of the nuclear reactor, which comprises:

guide tube disposed in the housing;

a connection pipe disposed inside the guide tube coaxially therewith and having a first end to which a control rod assembly is connected;

a ball spindle disposed inside the connection pipe and supported thereby so as to be rotatable;

a ball nut assembly engaged with the ball spindle so as to be axially movable along the ball spindle, said ball nut assembly supporting a second end of the connection pipe;

a hydraulic motor unit operatively connected to the ball spindle so as to rotate the ball spindle and including a motor case, a first hydraulic motor inserting the control rod assembly into the reactor core and a second hydraulic motor withdrawing the control rod assembly from the reactor core; and a transmission operatively connected to the hydraulic motor unit and transmitting power from the motor unit to the ball spindle, said transmission comprising a first bevel gear operatively connected to one of the hydraulic motors for insertion and withdrawal of the control rod assembly and a worm gear operatively connected to the ball spindle, the worm gear supporting the position of the control rod assembly, wherein when the hydraulic motor unit is driven, the ball spindle is rotated, the ball nut assembly engaged with the ball spindle is axially rotated, and the connection pipe supported by the ball nut assembly is vertically driven to thereby drive the control rod assembly for inserting or withdrawing the control rod assembly into or from a reactor core, wherein the nuclear reactor comprises a boiling water reactor and four fuel assemblies are disposed in respective sections formed as a unit fuel assembly structure by a cross-shaped control rod and wherein a plurality of such unit fuel assembly structures are arranged in a core of the boiling water reactor, the control rods being driven by a control rod driving system including a control rod driving apparatus which has a control rod for a power-adjustment unit, said control-rod drive apparatus having a screw-drive structure which includes a spindle in which a nut engages with a mechanism, said mechanism vertically moving the connecting pipe and establishing connection with the control rods and another control rod driving apparatus driving control rods for the units except the power-adjustment unit which is formed into a hydraulic pressure piston drive structure comprising a mechanism vertically moving a connection pipe and establishing connection with said control rod, a piston and a cylinder, and said screw drive structure is driven by a hydraulic motor;

wherein the source supplying driving water driving the hydraulic pressure piston drive structure and the source supplying driving water driving said screw drive structure have a common hydraulic pressure supply apparatus; and wherein the control rod for the power-adjustment unit includes a drive structure which simultaneously drives a plurality of control rods.

27. A control rod driving apparatus driving a control rod assembly of a nuclear reactor and disposed in a housing mounted to a reactor pressure vessel of the nuclear reactor, which comprises:

a guide tube disposed in the housing;

a connection pipe disposed inside the guide tube coaxially therewith and having a first end to which a control rod assembly is connected;

a ball spindle disposed inside the connection pipe and supported thereby so as to be rotatable;

a ball nut assembly engaged with the ball spindle so as to be axially movable along the ball spindle, said ball nut assembly supporting a second end of the connection pipe;

a hydraulic motor unit operatively connected to the ball spindle so as to rotate the ball spindle and including a motor case, a first hydraulic motor inserting the control rod assembly into the reactor core and a second hydraulic motor withdrawing the control rod assembly from the reactor core; and a transmission operatively connected to the hydraulic motor unit and transmitting power from the motor unit to the ball spindle, said transmission comprising a first bevel gear operatively connected to one of the hydraulic motors for insertion and withdrawal of the control rod assembly and a worm gear operatively connected to the ball spindle, the worm gear supporting the position of the control rod assembly, wherein when the hydraulic motor unit is driven, the ball spindle is rotated, the ball nut assembly engaged with the ball spindle is axially rotated, and the connection pipe supported by the ball nut assembly is vertically driven to thereby drive the control rod assembly for inserting or withdrawing the control rod assembly into or from a reactor core, a hydraulic pressure supply pipe supplying hydraulic pressure to the reaction pressure vessel wherein a change-over valve is disposed at an intermediate portion of the hydraulic pressure supply pipe, said change-over valve having a structure changing over flow of the driving water while enabling at least two operations of the control rod insertion operation, said two operations comprising the control rod withdrawal operation and an emergency control rod insertion operation; and wherein said change-over valve comprises an introduction port introducing the driving water, a plurality of ports branched from the introduction port, a spring disposed inside the respective ports and a valve body opened and closed due to a balance between a biasing force of the spring and hydraulic pressure transmitted through the introduction port.

28. A control rod driving apparatus driving a control rod assembly of a nuclear reactor and disposed in a housing mounted to a reactor pressure vessel of the nuclear reactor, which comprises:

a guide tube disposed in the housing;

a connection pipe disposed inside the guide tube coaxially therewith and having a first end to which a control rod assembly is connected;

a ball spindle disposed inside the connection pipe and supported thereby so as to be rotatable;

a ball nut assembly engaged with the ball spindle so as to be axially movable along the ball spindle, said ball nut assembly supporting a second end of the connection pipe;

a hydraulic motor unit operatively connected to the ball spindle so as to rotate the ball spindle and including a motor case, a first hydraulic motor inserting the control rod assembly into the reactor core and a second hydraulic motor withdrawing the control rod assembly from the reactor core; and a transmission operatively connected to the hydraulic motor unit and transmitting power from the motor unit to the ball spindle, said transmission comprising a first bevel gear operatively connected to one of the hydraulic motors for insertion and withdrawal of the control rod assembly and a worm gear operatively connected to the ball spindle, the worm gear supporting the position of the control rod assembly, wherein when the hydraulic motor unit is driven, the ball spindle is rotated, the ball nut assembly engaged with the ball spindle is axially rotated, and the connection pipe supported by the ball nut assembly is vertically driven to thereby drive the control rod assembly for inserting or withdrawing the control rod assembly into or from a reactor core, and wherein driving water is introduced into the hydraulic motor unit by a hydraulic pressure supply pipe and said hydraulic pressure supply pipe has a double-pipe structure.

29. A control rod driving apparatus driving a control rod assembly of a nuclear reactor and disposed in a housing mounted to a reactor pressure vessel of the nuclear reactor, which comprises:

a guide tube disposed in the housing;

a connection pipe disposed inside the guide tube coaxially therewith and having a first end to which a control rod assembly is connected;

a ball spindle disposed inside the connection pipe and supported thereby so as to be rotatable;

a ball nut assembly engaged with the ball spindle so as to be axially movable along the ball spindle, said ball nut assembly supporting a second end of the connection pipe;

a hydraulic motor unit operatively connected to the ball spindle so as to rotate the ball spindle and comprising a single hydraulic motor of a structure which is reversibly operable, said structure inserting the control rod assembly into the reactor core and withdrawing the control rod assembly from the reactor core; and a transmission operatively connected to the hydraulic motor unit and transmitting power from the hydraulic motor unit to the ball spindle, said transmission comprising a bevel gear operatively connected to said single hydraulic motor and a worm gear operatively connected to the ball spindle, the worm gear supporting the position of the control rod assembly, wherein when the hydraulic motor unit is driven, the ball spindle is rotated, the ball nut assembly engaged with the ball spindle is axially rotated, and the connection pipe supported by the ball nut assembly is driven vertically to thereby drive the control rod assembly for inserting or withdrawing the control into or from a reactor core, wherein the nuclear reactor comprises a boiling water reactor and four fuel assemblies are disposed in respective sections formed as a unit fuel assembly structure by a cross-shaped control rod and wherein a plurality of such unit fuel assembly structures are arranged in a core of the boiling water reactor, the control rods being driven by a control rod driving system including a control rod driving apparatus which has a control rod for a power-adjustment unit, said control-rod drive apparatus having a screw-drive structure which includes a spindle in which a nut engages with a mechanism, said mechanism vertically moving the connecting pipe and establishing connection with the control rods and another control rod driving apparatus driving control rods for the units except the power-adjustment unit which is formed into a hydraulic pressure piston drive structure comprising a mechanism vertically moving a connection pipe and establishing connection with said control rod, a piston and a cylinder, and said screw drive structure is driven by a hydraulic motor, wherein the source supplying driving water driving the hydraulic pressure piston drive structure and the source supplying driving water driving said screw drive structure have a common hydraulic pressure supply apparatus; and the control rod for the power-adjustment unit includes a drive structure which simultaneously drives a plurality of control rods.

30. A control rod driving apparatus driving a control rod assembly of a nuclear reactor and disposed in a housing mounted to a reactor pressure vessel of the nuclear reactor, which comprises:

a guide tube disposed in the housing;

a connection pipe disposed inside the guide tube coaxially therewith and having a first end to which a control rod assembly is connected;

a ball spindle disposed inside the connection pipe and supported thereby so as to be rotatable;

a ball nut assembly engaged with the ball spindle so as to be axially movable along the ball spindle, said ball nut assembly supporting a second end of the connection pipe;

a hydraulic motor unit operatively connected to the ball spindle so as to rotate the ball spindle and comprising a single hydraulic motor of a structure which is reversibly operable, said structure inserting the control rod assembly into the reactor core and withdrawing the control rod assembly from the reactor core; and a transmission operatively connected to the hydraulic motor unit and transmitting power from the hydraulic motor unit to the ball spindle, said transmission comprising a bevel gear operatively connected to said single hydraulic motor and a worm gear operatively connected to the ball spindle, the worm gear supporting the position of the control rod assembly, wherein when the hydraulic motor unit is driven, the ball spindle is rotated, the ball nut assembly engaged with the ball spindle is axially rotated, and the connection pipe supported by the ball nut assembly is driven vertically to thereby drive the control rod assembly for inserting or withdrawing the control into or from a reactor core, wherein driving water is introduced to the hydraulic motor unit by a pressure supply pipe and a change-over valve is disposed at an intermediate portion of the hydraulic pressure supply pipe, said change-over valve has a structure changing over flow of the driving water while enabling at least two operations of the control rod insertion operation, said two operations comprising the control rod withdrawal operation and an emergency control rod insertion operation; and wherein said change-over valve comprises an introduction port introducing the driving water, a plurality of ports branched from the introduction port, a spring disposed inside the respective ports and a valve body opened and closed due to a balance between a biasing force of the spring and hydraulic pressure transmitted through the introduction port.

31. A control rod driving apparatus driving a control rod assembly of a nuclear reactor and disposed in a housing mounted to a reactor pressure vessel of the nuclear reactor, which comprises:

a guide tube disposed in the housing;

a connection pipe disposed inside the guide tube coaxially therewith and having a first end to which a control rod assembly is connected;

a ball spindle disposed inside the connection pipe and supported thereby so as to be rotatable;

a ball nut assembly engaged with the ball spindle so as to be axially movable along the ball spindle, said ball nut assembly supporting a second end of the connection pipe;

a hydraulic motor unit operatively connected to the ball spindle so as to rotate the ball spindle and comprising a single hydraulic motor of a structure which is reversibly operable, said structure inserting the control rod assembly into the reactor core and withdrawing the control rod assembly from the reactor core; and a transmission operatively connected to the hydraulic motor unit and transmitting power from the hydraulic motor unit to the ball spindle, said transmission comprising a bevel gear operatively connected to said single hydraulic motor and a worm gear operatively connected to the ball spindle, the worm gear supporting the position of the control rod assembly, wherein when the hydraulic motor unit is driven, the ball spindle is rotated, the ball nut assembly engaged with the ball spindle is axially rotated, and the connection pipe supported by the ball nut assembly is driven vertically to thereby drive the control rod assembly for inserting or withdrawing the control into or from a reactor core and wherein driving water is introduced into the hydraulic motor unit by a hydraulic pressure supply pipe and said hydraulic pressure supply pipe has a double-pipe structure.

* * * * *